United States Patent [19]
Krynicki

[11] Patent Number: 5,419,354
[45] Date of Patent: May 30, 1995

[54] FRANGIBLE CONNECTORS

[76] Inventor: Witold Krynicki, 321 W. Leroy Ave., Arcadia, Calif. 91007

[21] Appl. No.: 979,844

[22] Filed: Nov. 23, 1992

Related U.S. Application Data

[62] Division of Ser. No. 628,327, Dec. 14, 1990, Pat. No. 5,165,439.

[51] Int. Cl.⁶ .......................... F16L 29/04; F16L 25/00
[52] U.S. Cl. ...................... 137/1; 137/614.06; 251/149.7; 285/9.1
[58] Field of Search .............. 137/1, 614.06; 251/149.7; 285/9.1

[56] References Cited

U.S. PATENT DOCUMENTS

| | | | |
|---|---|---|---|
| 2,426,471 | 8/1947 | Snyder | 137/614.06 |
| 2,465,146 | 3/1949 | Broussard | 137/614.06 X |
| 3,181,895 | 5/1965 | Cator | 285/9.1 |
| 3,586,048 | 6/1971 | Arnold | 285/9.1 X |
| 4,049,295 | 9/1977 | Piers | 285/9.1 |
| 4,260,180 | 4/1981 | Halushka et al. | 285/9.1 |

FOREIGN PATENT DOCUMENTS

| | | | |
|---|---|---|---|
| 3703554 | 8/1988 | Germany | 137/614.06 |
| 983278 | 2/1965 | United Kingdom | 285/9.1 |

*Primary Examiner*—John Rivell

[57] ABSTRACT

Methods and apparatus for controlling a fluid passage provide at least one sliding gate movable transversely to that fluid passage. The fluid passage or the gate is maintained open in a first position of the gate, and is closed in a second position of that gate. A detent detains the gate in one of its first and second positions against a bias acting continuously on that gate. Upon release from that detent, the gate slides by virtue of its bias to the other of its first and second positions. The gate and fluid passage may be incorporated in a frangible connection and the gate may be released from its detent for automatic closure by its bias upon breakage of that frangible connection. Alternatively, the gate may be provided with a slanted surface which abuts another slanted surface around the fluid passage in the first position of the gate.

5 Claims, 18 Drawing Sheets

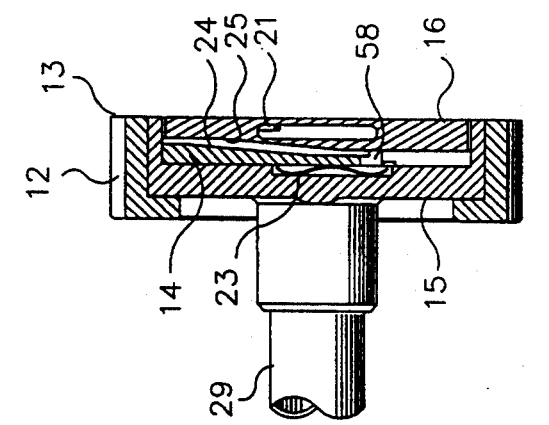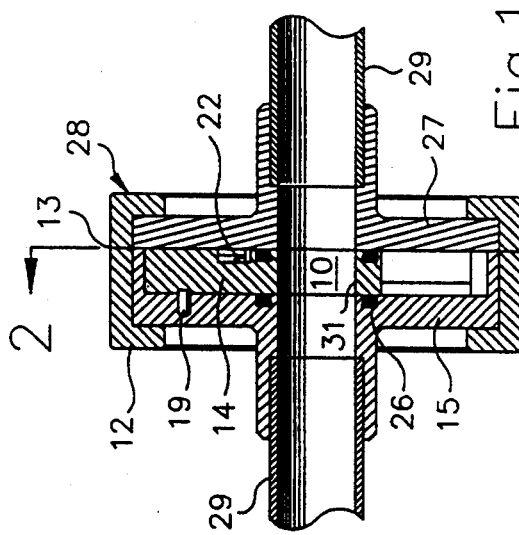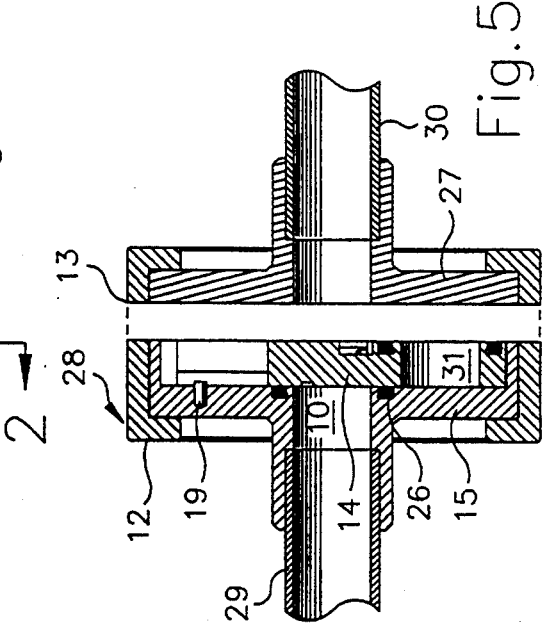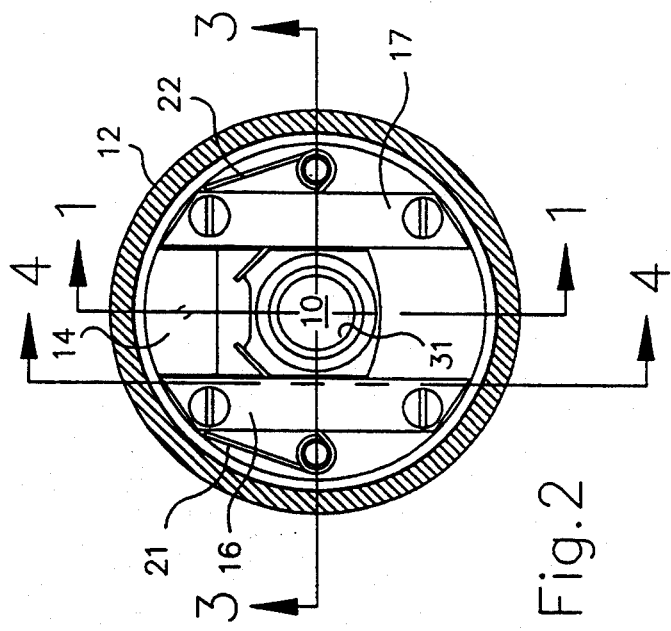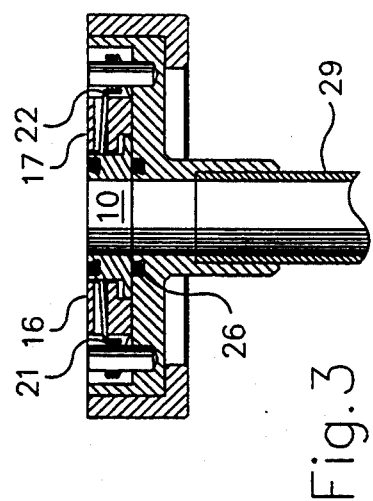

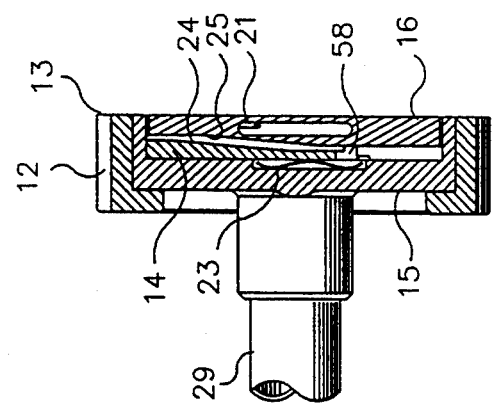
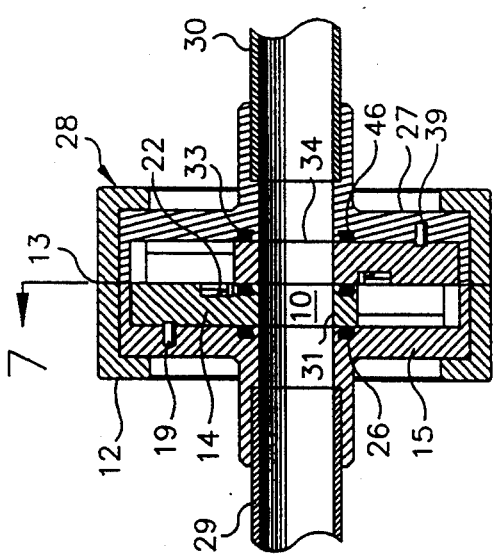
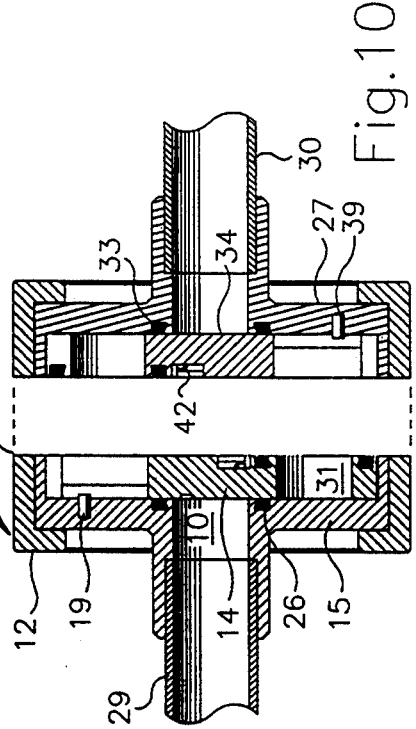
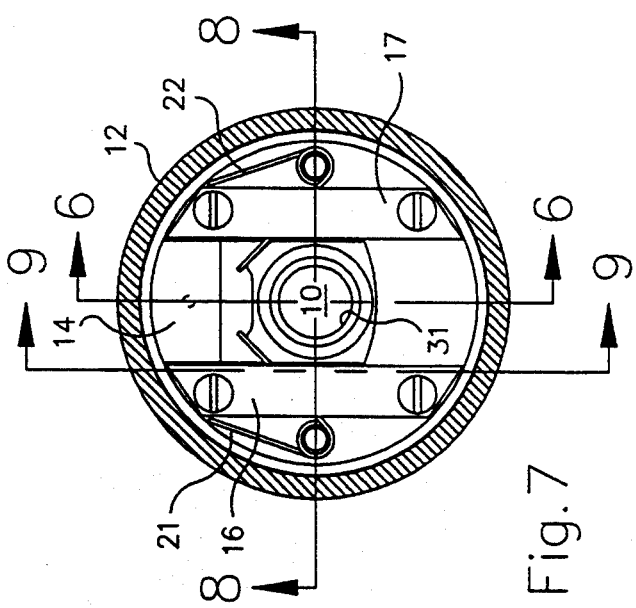
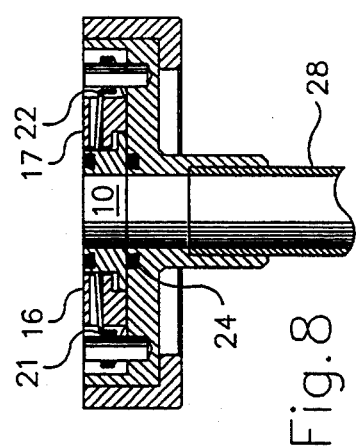

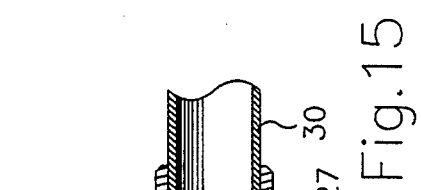
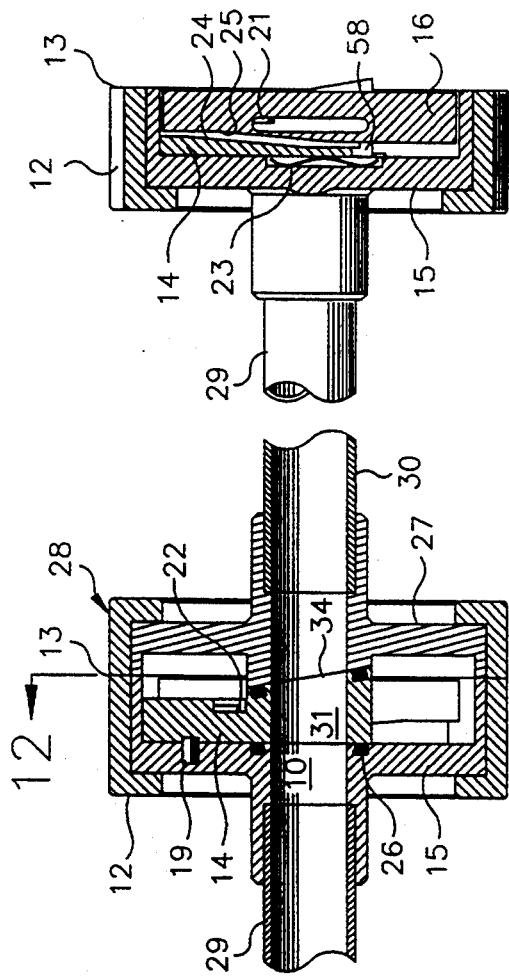
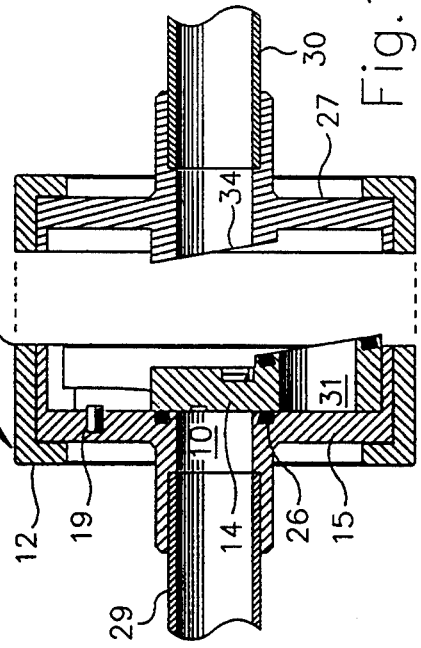
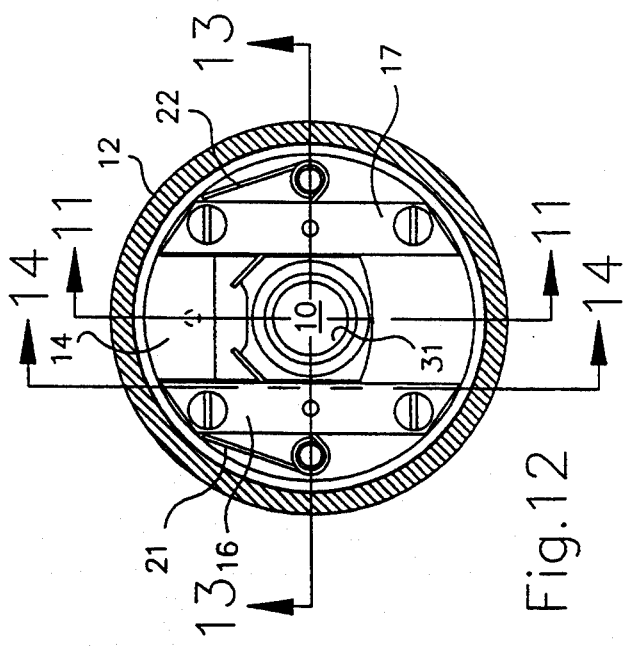
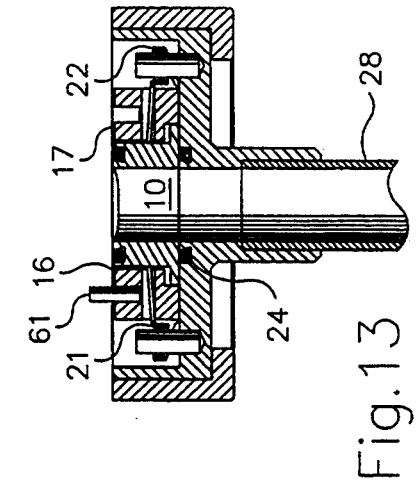

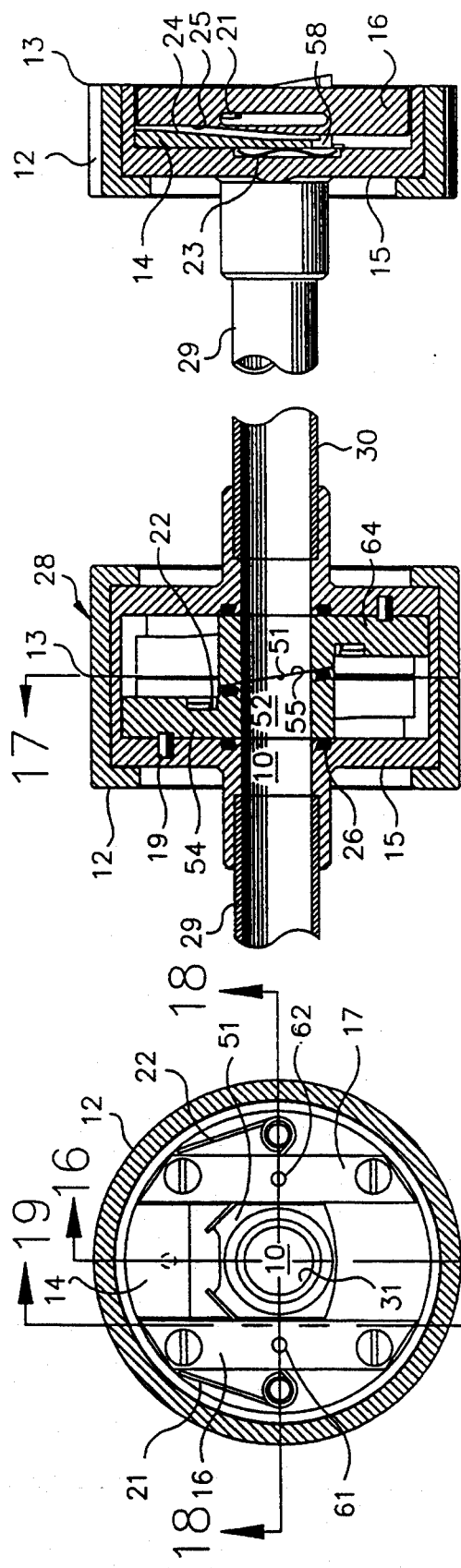
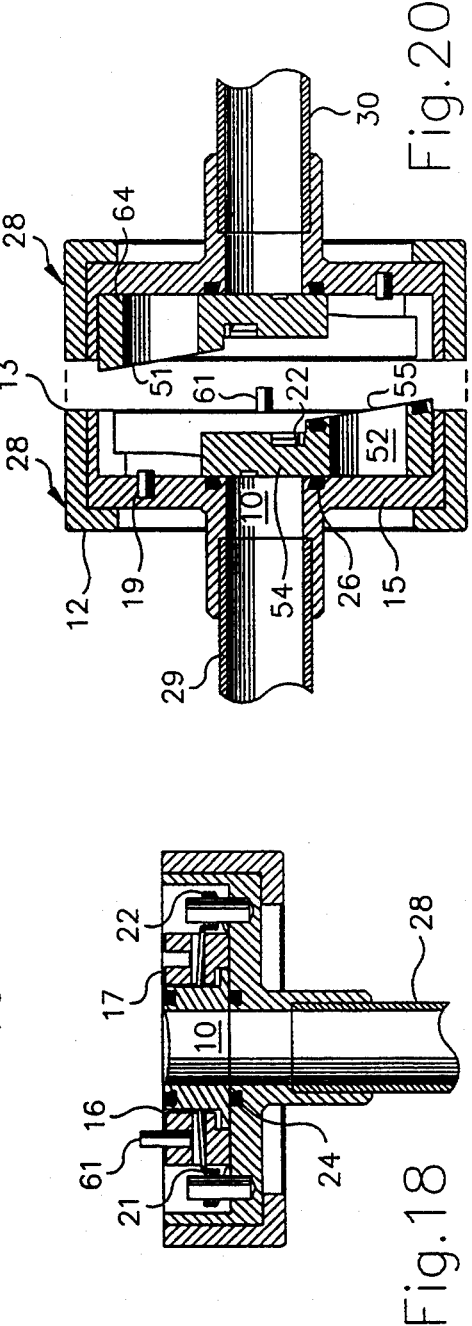

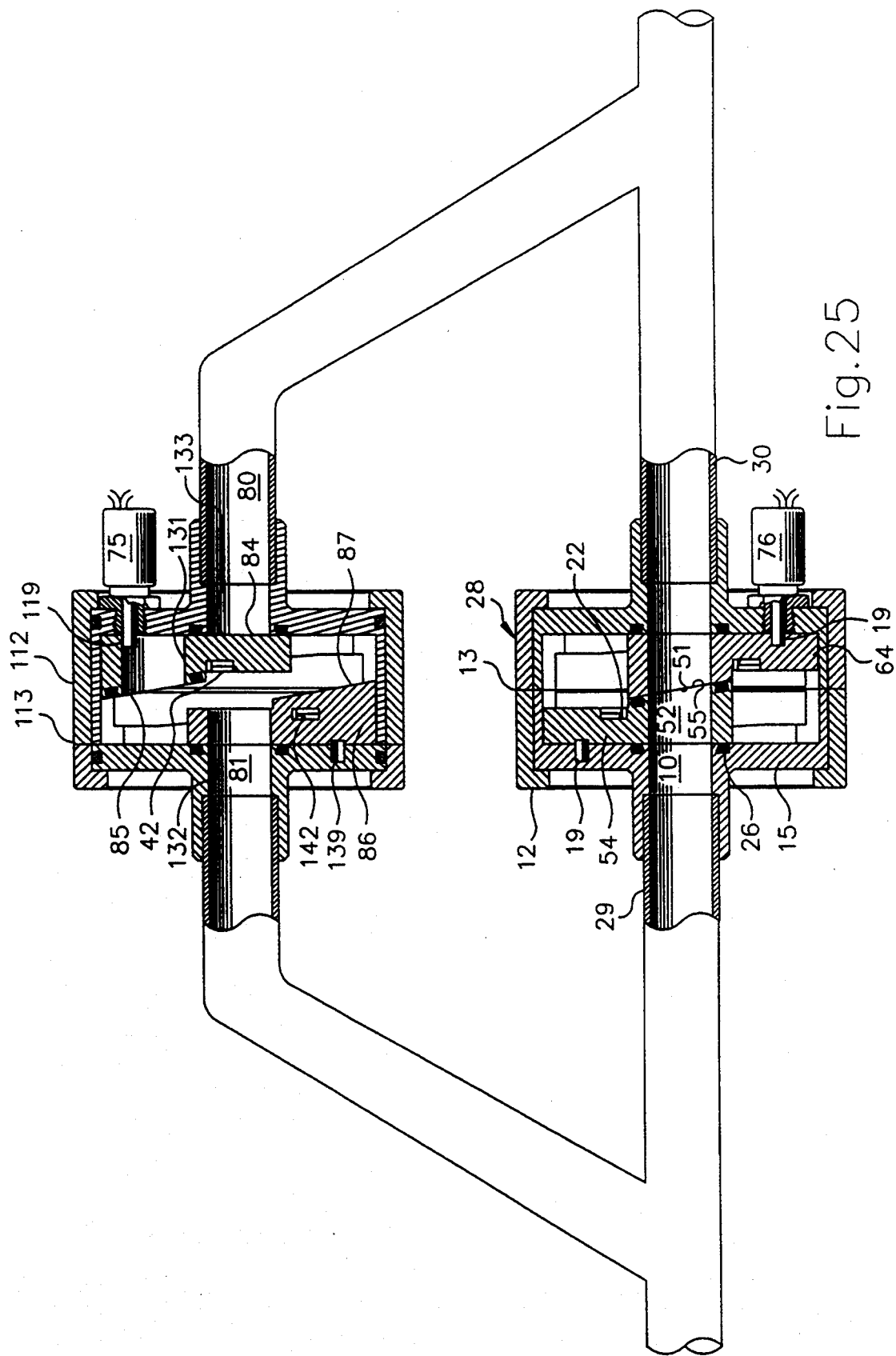

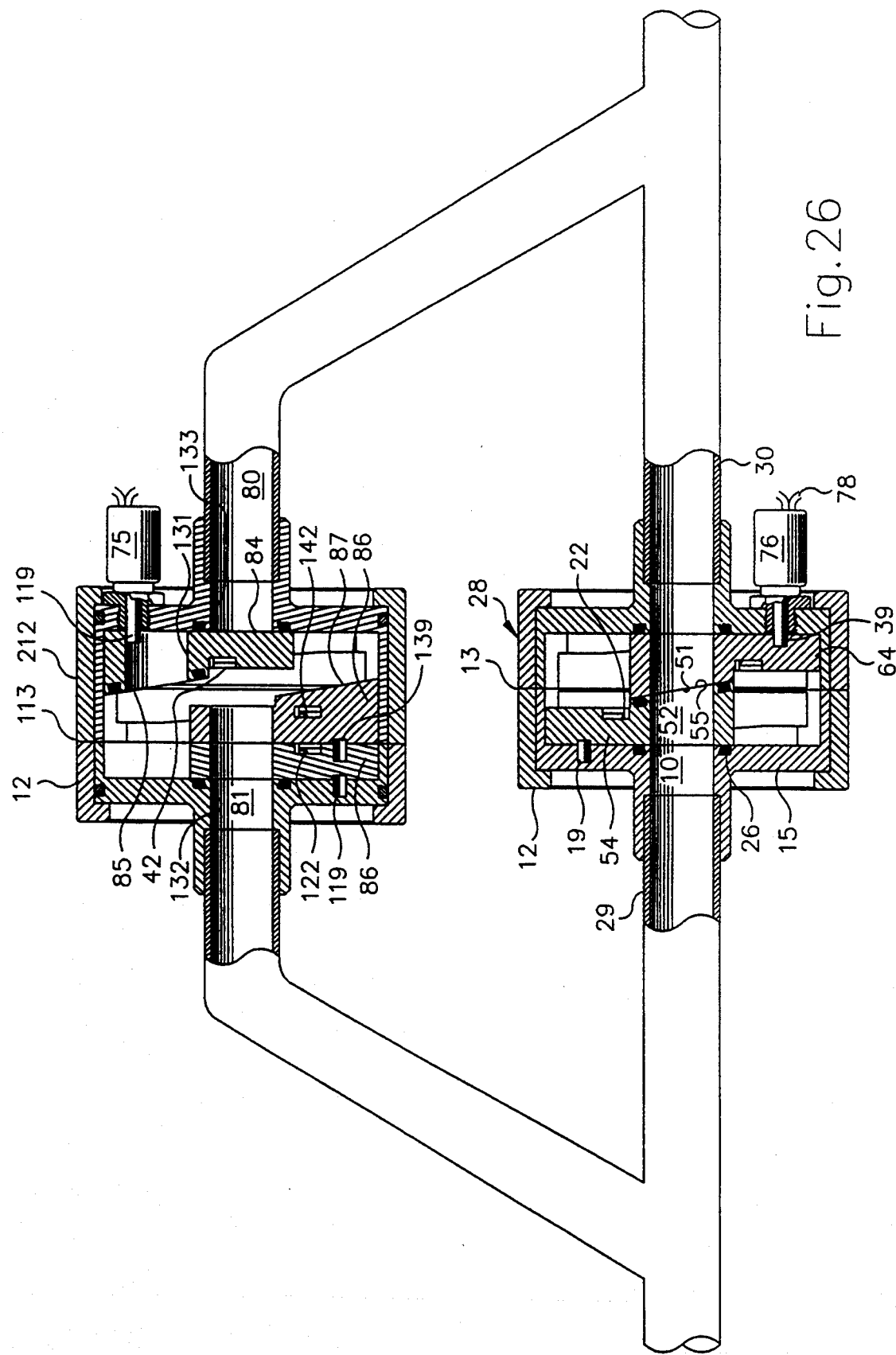

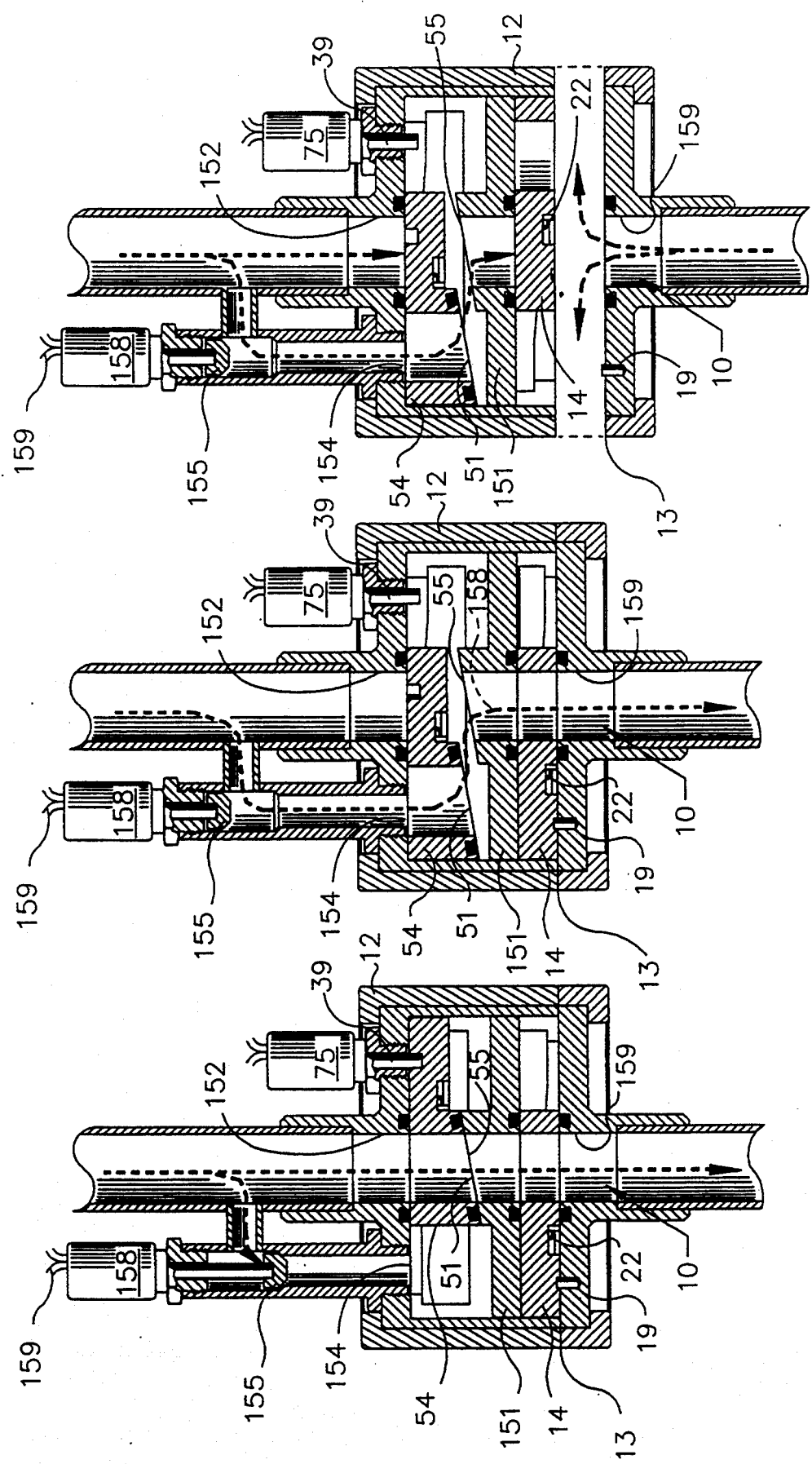

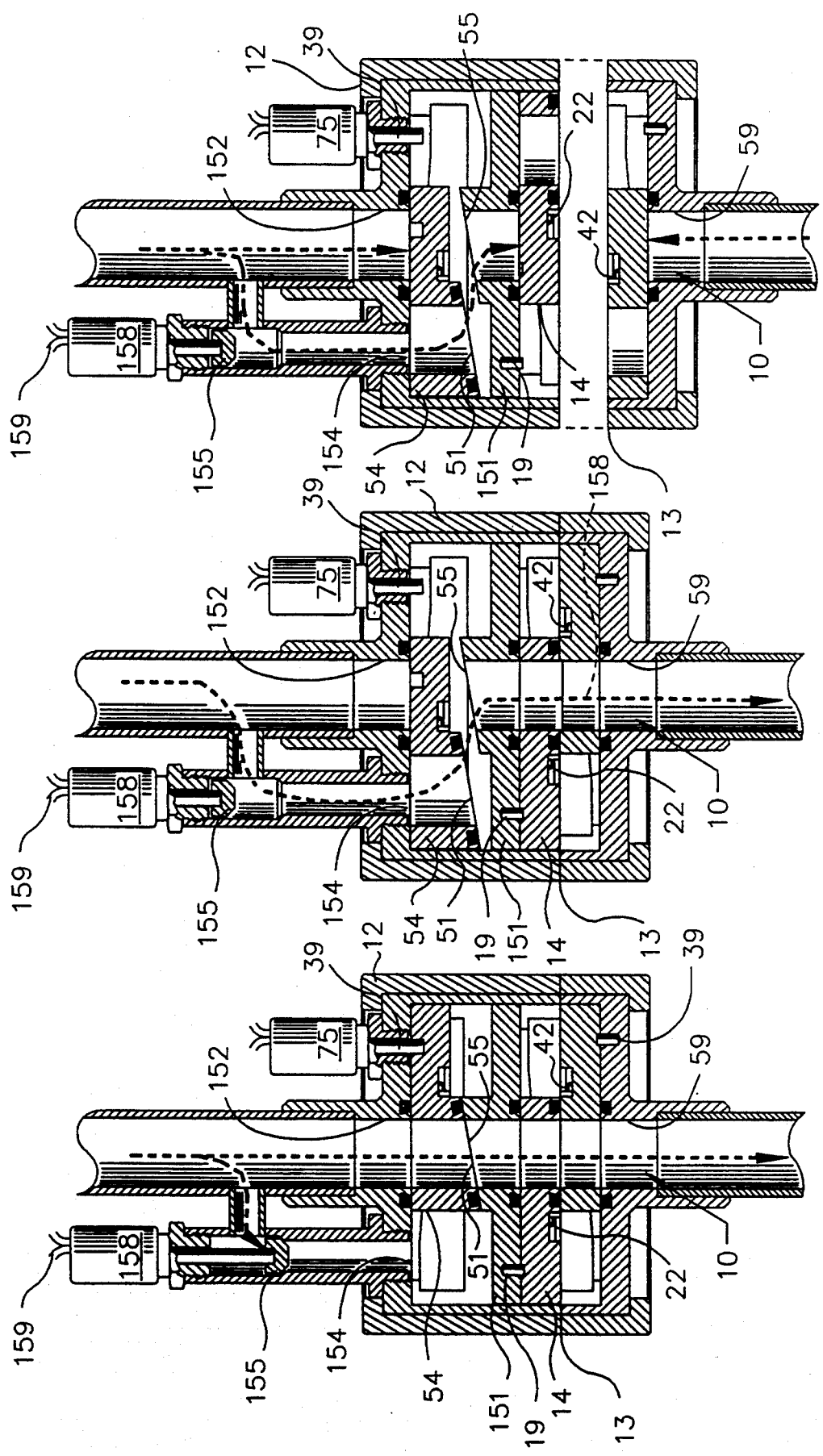

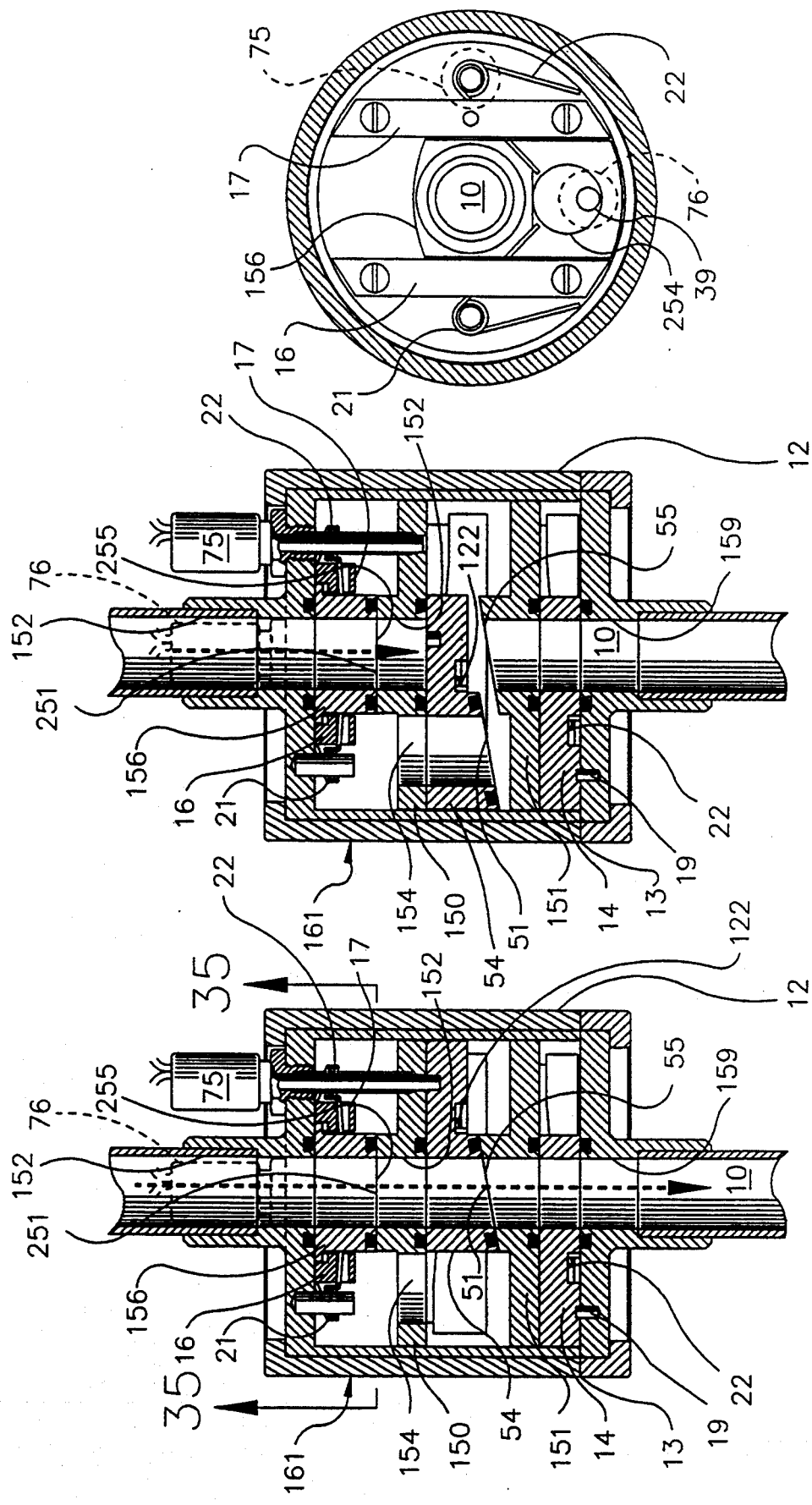

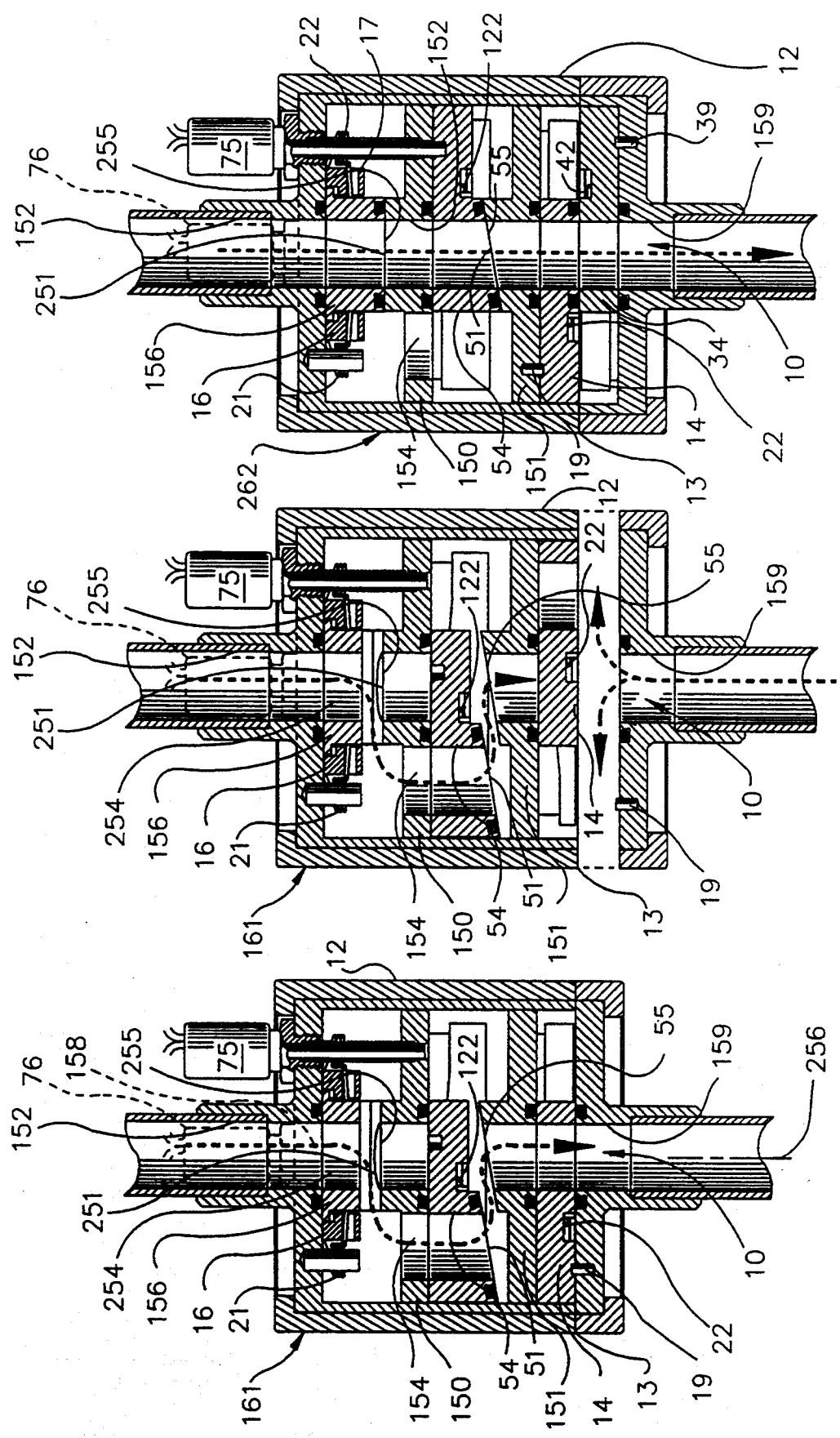

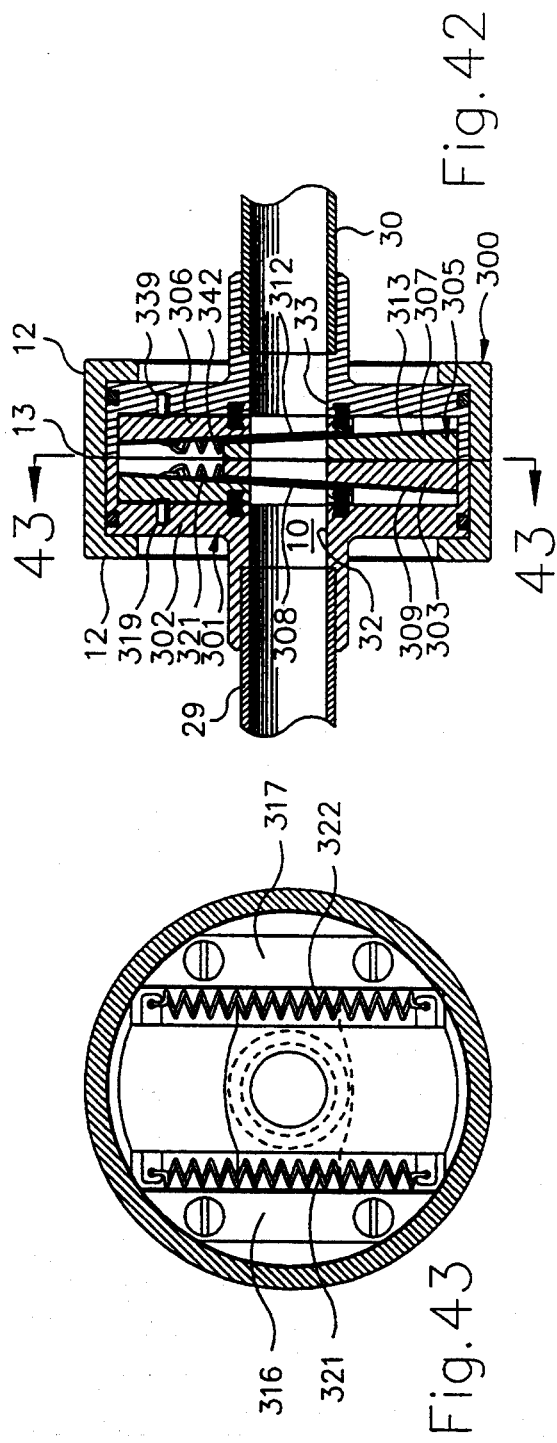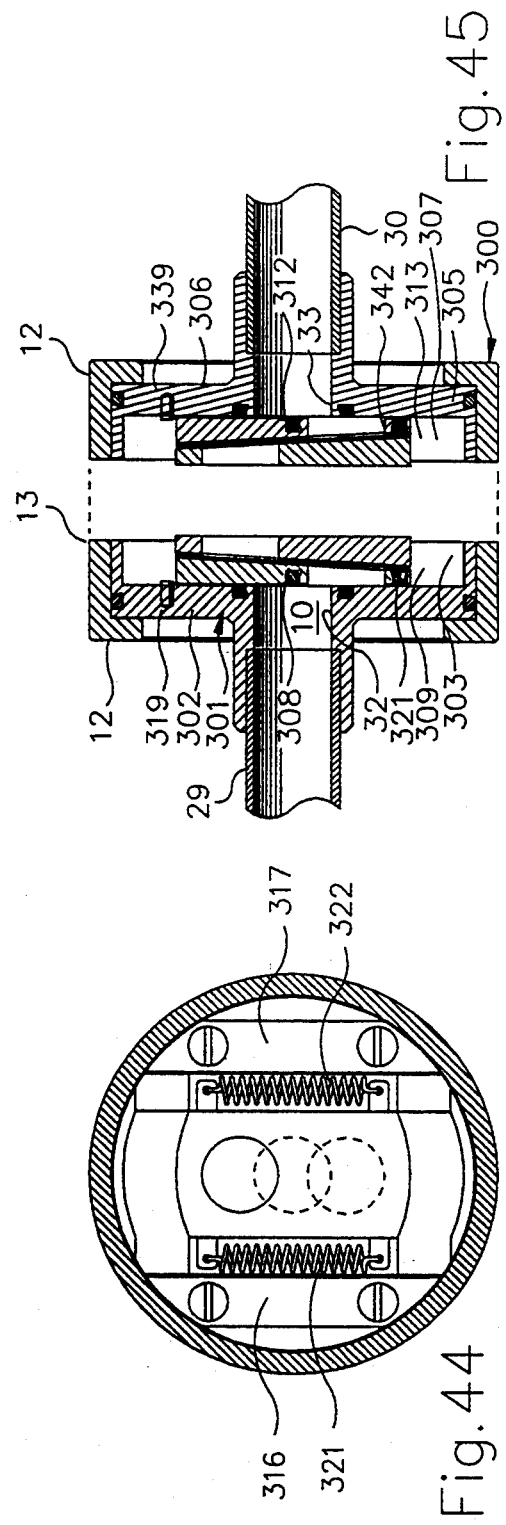

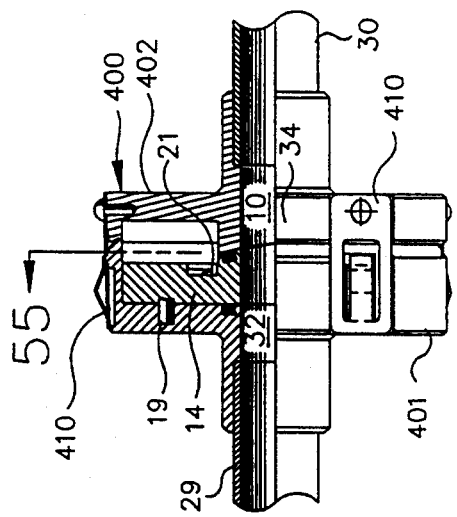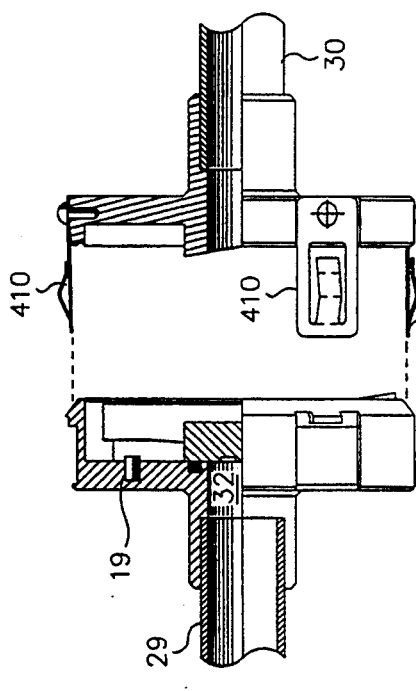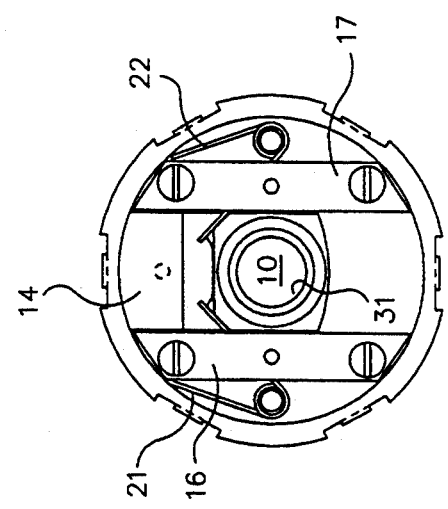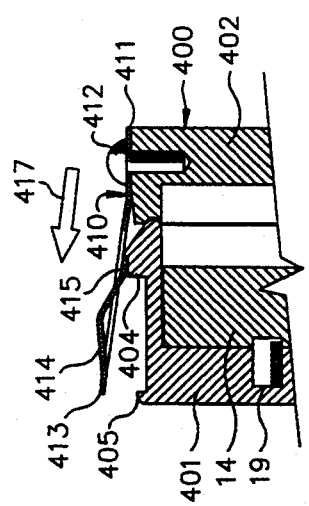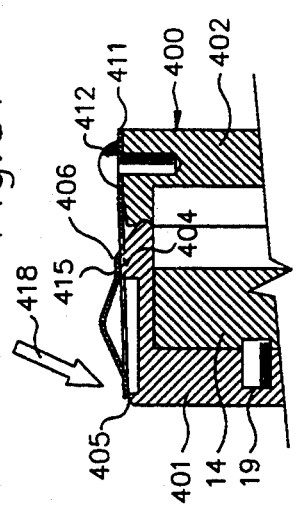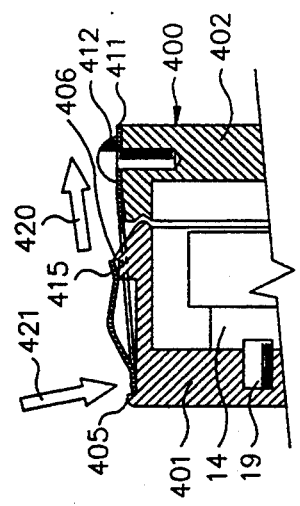

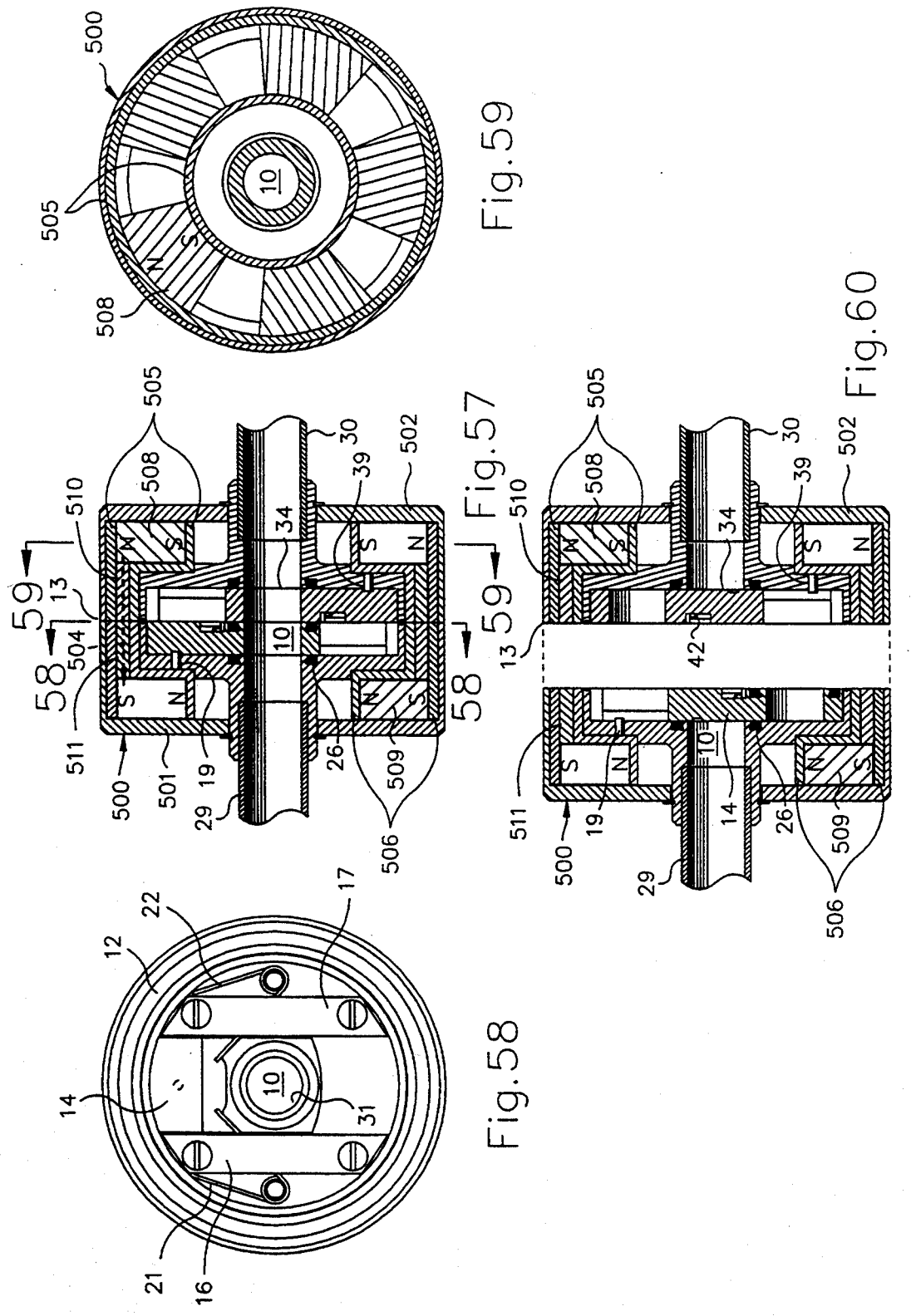

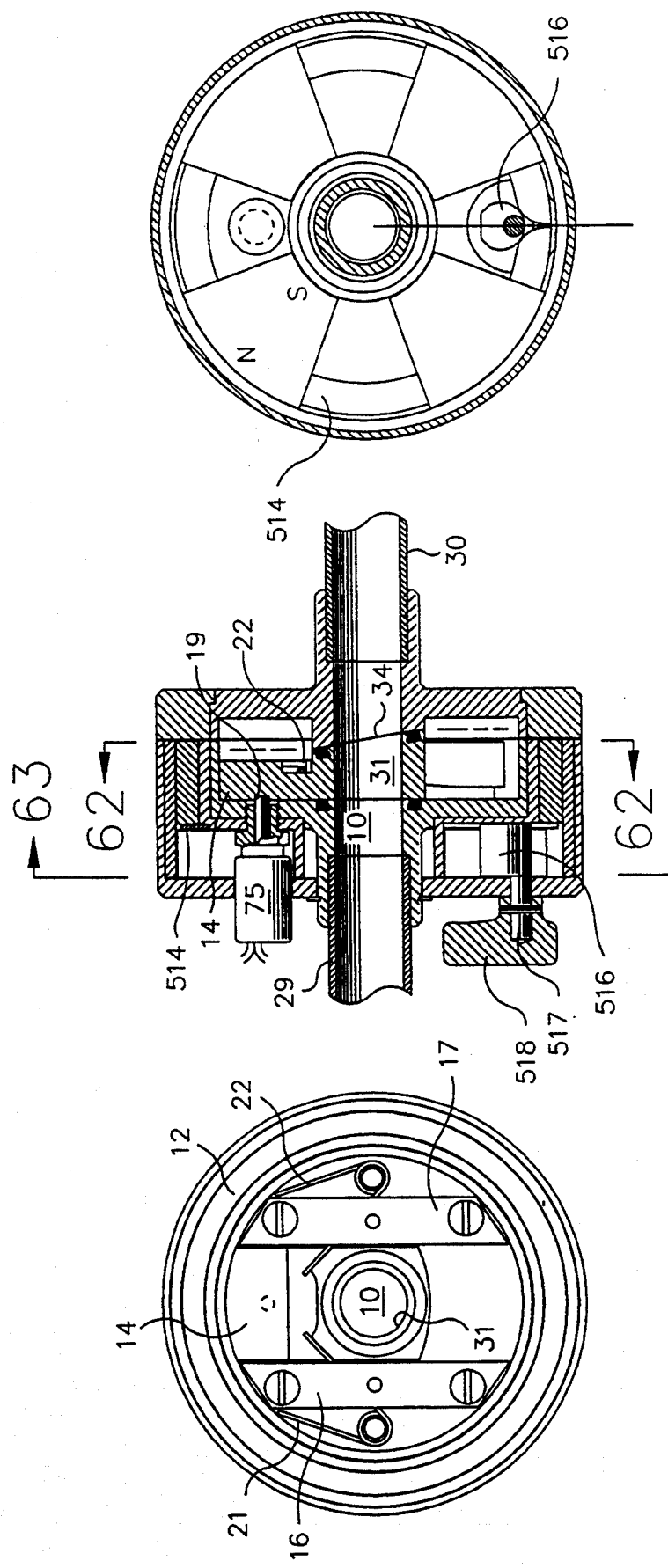

FRANGIBLE CONNECTORS

This application is a Divisional application of U.S. application Ser. No. 07/628,327, filed Dec. 14, 1990, now U.S. Pat. No. 5,165,439.

FIELD OF THE INVENTION

The invention relates to fluid handling systems and apparatus, to frangible and other fluid connectors, to valving and fluid gating, to connectors and to connector systems with and without valves.

INFORMATION DISCLOSURE STATEMENT

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of a pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, the invention is not intended to be limited by any recided sequence of method steps or apparatus elements.

U.S. Pat. No. 991,690, by C. L. Bowker, issued May 9, 1911, for a gate valve using wedge-shaped ribs for forcing valve disks into engagement with their seats.

U.S. Pat. No. 1,995,727, by H. L. Wetherbee, issued Mar. 26, 1935, for valve for hot gas mains, also using a wedge to force the valve against its seat.

U.S. Pat. No. 2,001,094, by F. Cuttle, issued May 14, 1935, for a gate valve using inclined surfaces for dislodging the gate.

U.S. Pat. No. 2,282,553, by M. W. Banowetz, issued May 12, 1942, for a gate valve using matching inclined gate and valve seat surfaces for sealing the valve shut.

U.S. Pat. No. 2,614,792, by J. Trefil, issued Oct. 21, 1952 for valve guide means transverse inclined surfaces for holding a closure member shut.

U.S. Pat. No. 2,823,888, by R. O. Wynn, issued Feb. 18, 1958, for a gate valve using two ported abutting gate members having complementary inclined inner faces for a valve sealing wedging action.

U.S. Pat. No. 2,834,571, by W. C. Hollander, issued May 13, 1958, for valves with wedging valve elements.

U.S. Pat. No. 2,947,511, by W. McInnes, issued Aug. 2, 1960, for valves with closing wedges.

U.S. Pat. No. 3,039,734, by D. W. Blevans, issued Jun. 19, 1962, for gate valves having wedge faces for moving a sealing ring into sealing engagement.

U.S. Pat. No. 3,138,174, by W. B. Gilpin, issued Jun. 23, 1964, discloses valves for automatically reducing the flow of a fluid which is in excess of normal flow. However, even in the open condition of the valve, the fluid passage is obstructed by a tubular piston extension in a restrictive orifice.

U.S. Pat. No. 3,358,961, by R. A. Montgomery et al, issued Dec. 19, 1967, discloses a pressure relief gate valve in which the gate or shutter is driven by an explosive.

U.S. Pat. No.3,399,728, by A. R. Taylor, issued Sept. 3, 1968, discloses a conduit closure apparatus in which rams are hydraulically driven to crush a collapsible sleeve thereby sealing off a fluid passage.

U.S. Pat. No.3,434,692, by C. L. Tillman, issued Mar. 25, 1969, for a bifaced wedged gate valve using wedges and camming members for tight closure.

U.S. Pat. No.3,557,822, by C. H. Chronister, issued Jan. 26, 1971, for a gate valve having telescoping sleeve coacting sealing wedges.

U.S. Pat. No. 3,559,949, by E. Muller, issued Feb. 2, 1971, for a gate valve with inclined spindle for wedging action of the valve disk.

U.S. Pat. No. 3,602,481, by L. Martin et al, issued Aug. 31, 1971, for a resilient seat gate valve with disk wedging action.

U.S. Pat. No. 3,692,043, by C. A. H. M. Waskowsky, issued Sept. 19, 1972, discloses a safety appliance for preventing an excessive flow of fluid, such as upon rupture of a pipe, wherein a fluid locking device obstructs a fluid flow passage at least partially, even in the open condition of the appliance.

U.S. Pat. No.3,895,777, by E. G. Althaus, issued Jul. 22, 1975, for a gate valve with wedge-shaped gate for increased sealing action.

U.S. Pat. No. 3,921,656, by D. T. Meisenheimer, Jr, et al, issued Nov. 25, 1975, discloses self-closing breakaway valve assemblies in which a trigger mechanism is in the fluid flow path between spring-biased rotary valve members.

U.S. Pat. 3,974,852, by T. Svensson, issued Aug. 17, 1976, discloses a hose rupture valve in which a flow restriction disc is continuously in the fluid passage in one position or the other.

U.S. Pat. No. 4,090,524, by A. R. Allread et al, issued May 23, 1978, discloses a frangible valved fitting utilizing spring-biased flapper valves.

U.S. Pat. No. 4,179,099, by E. K. Pierce, Jr., issued Dec. 18, 1979, for an expanding gate valve with cam surfaces for wedging action.

U.S. Pat. No. 4,195,813, by N. Cho, issued Apr. 1, 1980, for a valve with interacting inclined surfaces for valve sealing action.

U.S. Pat. No. 4,319,604, by R. E. Bird, issued Mar. 16, 1982, discloses a safety shut-off valve wherein valve elements are continuously in the fluid flow passage.

U.S. Pat. No.4,326,555, by J. G. Thomson, issued Apr. 27, 1982, discloses a breakaway coupling having spring-biased pivotally moveable valve petals.

U.S. Pat. No.4,351,351, by J. F. Flory et al, issued Sep. 28, 1982, discloses a breakaway pipe coupling having spring-biased rotary valves interconnected by crank and rod couplings.

U.S. Pat. No. 4,361,165, by J. F. Flory, issued Nov. 30, 1982, discloses a breakaway type coupling wherein one or more spring-biased flapper valves are continuously disposed in the fluid passage in one position or another.

U.S. Pat. No. 4,373,548, by M. S. Chou, issued Feb. 15, 1983, discloses a gas flow safety control device in which valve elements are continuously disposed in the gas flow passage.

U.S. Pat. 4,465,096, by L. G. Voisine, issued Aug. 14, 1984, discloses a breakaway fluid valve coupling in which valve elements are also continuously disposed in the fluid flow passage.

U.S. Pat. No. 4,483,509, by Lewcock et al., issued Nov. 20, 1984, for a guillotine valve assembly with slanted rails for improved valve sealing.

U.S. Pat. No. 4,614,201, by F. E. King et al, issued Sept. 30, 1986, discloses a breakaway coupling for hose lines in which valve elements are also continuously disposed in the fluid flow passage, even in the open valve condition.

U.S. Pat. No. 4,640,303, by D. S. Greenberg, issued Feb. 3, 1987, discloses a seismically activated valve in which a ferromagnetic ball is magnetically suspended, but drops into a closure position if seismically moved.

U.S. Pat. No.4,688,592, by E. G. Tibbals, Jr, issued Aug. 25, 1987, discloses an earthquake tremor-responsive shut-off valve including a magnetically suspended pendulous weight adapted to be dropped for closure of the valve upon occurence of a tremor.

U.S. Pat. No. 4,745,939, by C. W. Greer et al, issued May 24, 1988, discloses a shock-actuated shut-off valve with a tethered reset system.

U.S. Pat. No. 4,785,842, by A. W. Johnson, Jr, issued Nov. 22, 1988, discloses a resettable vibration-actuated emergency shutoff mechanism wherein a magnetically suspended valve mechanism is continuously disposed in the fluid flow passage.

U.S. Pat. No. 4,817,657, by M. Kovacs, issued Apr. 4, 1989, discloses an inertially activated shutoff valve wherein a plug is jarred free from a magnetic holding position to block the flow of fluid to the valve.

U.S. Pat. No. 4,833,461, by R. Yeager issued May 23, 1989, discloses electrical circuitry for closing a gas line under the control of a motion detector.

U.S. Pat. No.4,844,113, by C. R. Jones, issued Jul. 4, 1989, discloses a safety valve in which a moveable popper is held in a stable position by magnets and by a moveable weight, which displaces the popper in response to a seismic event.

SUMMARY OF THE INVENTION

It is an object of the invention to provide improved methods and apparatus for blocking a fluid passage.

It is germane object of the invention to provide improved frangible fluid connectors and frangible connector systems.

It is a related object of the invention to provide improved methods and apparatus for controlling a fluid passage.

It is also an object of the invention to provide improved methods and apparatus for selectively blocking and deblocking fluid ports and passages.

It is also an object of the invention to provide improved methods and apparatus for gating fluid.

It is a further object of the invention to provide improved connectors and connector systems.

Other objects of the invention will become apparent in the further course of this disclosure.

The invention resides in a method of blocking a fluid passage, comprising in combination the steps of incorporating that fluid passage in a frangible connection, providing a sliding gate movable transversely to that fluid passage in the frangible connection, maintaining the fluid passage open with the gate in a first position of that gate, closing the fluid passage with the gate in a second position of that gate, providing a detent and detaining the gate with that detent in an open position against a bias acting continuously on that gate, releasing the sliding gate from that detent upon breakage of the frangible connection for sliding movement transversely to the fluid passage, sliding the gate by virtue of its bias to a closed position, and sealing that gate to the fluid passage in the closed position of the gate.

From a related aspect thereof, the invention resides in apparatus for blocking a fluid passage, comprising, in combination, a frangible connection around that fluid passage, a sliding gate, means for mounting that sliding gate in that frangible connection for movement transversely to the fluid passage between a first position wherein the fluid passage is maintained open with the gate, and a second position wherein that fluid passage is closed by that gate, a detent detaining the gate in the first position, a bias acting continuously on the gate for propelling that gate to the other of its first and second positions upon release from its detent, and means for releasing the sliding gate from its detent upon breakage of the frangible connection for sliding movement transversely to the fluid passage to its second position whereby the fluid passage is closed by that gate.

The invention also resides in a method of controlling a fluid passage, comprising in combination the steps of, providing around the fluid passage a first surface slanted relative to that fluid passage, providing a sliding gate movable transversely to that fluid passage, providing that gate with a slanted second surface abutting the first surface in a first position of the gate, maintaining the gate open in the fluid passage in the first position of that gate, closing the fluid passage with the gate in a second position of that gate, providing a detent and detaining the gate with that detent in one of its first and second positions against a bias acting continuously on that gate, releasing the sliding gate from its detent for sliding movement transversely to the fluid passage, and sliding the gate by virtue of its bias to the other of the first and second positions.

From a related aspect thereof, the invention resides in apparatus for controlling a fluid passage, comprising, in combination, a first surface around the fluid passage slanted relative to that fluid passage, a sliding gate having a slanted second surface abutting that first surface in a first position of that gate, means for mounting that sliding gate for movement transversely to the fluid passage between its first position wherein the fluid passage is maintained open with its gate, and a second position wherein the fluid passage is closed by that gate, a detent detaining that gate in one of its first and second positions, a bias acting continuously on that gate for propelling that gate to the other of its first and second positions upon release from its detent, and means for releasing that sliding gate from its detent upon occurrence of a predetermined event for sliding movement transversely to the fluid passage.

The invention resides also in a method of selectively blocking and deblocking a fluid port in a fluid passage, comprising in combination the steps of, providing a pair of first and second sliding gates movable transversely to that fluid passage, providing the first gate with a first slanted surface around the fluid passage in an open position of that first gate, providing the second gate with a corresponding second slanted surface adjacent the fluid passage in an open position of that second gate, maintaining the fluid port open with the first gate in a first position of that first gate and closing the fluid port with that first gate in a second position of, that first gate relative to the fluid passage, providing a first detent and detaining the first gate with that first detent in one of its first and second positions against a first bias acting continuously on that first gate, releasing the first sliding gate from its first detent upon occurrence of a first event for sliding movement transversely to the fluid passage, propelling the first gate with its continuously acting first bias to the other of its first and second positions, providing a second detent and detaining the second gate with that second detent in an open position of that second gate against a second bias acting continuously on that second gate, releasing that second sliding gate from its second detent upon occurrence of a second event for sliding movement transversely to the fluid passage, closing the fluid passage with that second gate by propelling that second gate with its continuously acting second bias to its closed position, and sealing the first and second gates to each other at the first and second slanted surfaces in an open position of the first gate and in the closed position of that second gate.

The invention resides also in a method of selectively blocking and deblocking spaced first and second ports in a fluid passage, comprising in combination the steps of, providing a pair of first and second sliding gates movable transversely to that fluid passage, maintaining one of the first and second ports open with one of the first and second gates in a first position of that one of the first and second gates relative to the fluid passage, closing that one of the first and second ports with that one of the first and second gates in a second position of that one of the first and second gates, maintaining the other of the first and second ports open with the other of the first and second gates in a first position of that other of the first and second gates relative to the fluid passage, closing the other of the first and second ports with that other of the first and second gates in a second position of that other of the first and second gates, providing first and second detents and detaining the first and second gates with the first and second detents, respectively, in one of their respective first and second positions against a bias acting continuously on the gates, releasing the first sliding gate from its first detent upon occurrence of an event for sliding movement transversely to the fluid passage, propelling the first gate with its continuously acting bias to the other of its first and second positions, releasing the second sliding gate from its second detent upon occurrence of an event for sliding movement transversely to the fluid passage, and propelling the second gate with its continuously acting bias to the other of its first and second positions.

From a related aspect thereof, the invention resides in apparatus for selectively blocking and deblocking spaced first and second ports in a fluid passage, comprising in combination, a pair of first and second sliding gates, means for mounting one of the first and second sliding gates for movement transversely to the fluid passage between a first position wherein one of the first and second ports is maintained open with that one of the first and second gates, and a second position wherein that one of the first and second ports is closed by that one of said first and second gates, means for mounting the other of the first and second sliding gates for movement transversely to the fluid passage between a first position wherein the other of the first and second ports is maintained open with that other of the first and second gates, and a second position wherein that other of the first and second ports is closed by that other of, the first and second gates, first and second detents detaining the first and second gates, respectively, in one of their respective first and second positions, a bias acting continuously on the gates for propelling the gates to the other of their respective first and second positions upon release from their detents, means for releasing the first sliding gate from the first detent upon occurrence of an event for sliding movement transversely to the fluid passage, and means for releasing the second sliding gate from the second detent upon occurrence of an event for sliding movement transversely to the fluid passage.

The invention resides also in a method of selectively blocking and deblocking a first fluid port and a second fluid port in a fluid passage, comprising in combination the steps of, providing a first pair of first and second sliding gates movable transversely to that fluid passage at the first fluid port, providing a second pair of third and fourth sliding gates movable transversely to the fluid passage at the second fluid port, providing the first gate with a first slanted surface around the fluid passage, providing the second gate with a corresponding second slanted surface around the fluid passage adjacent the first slanted surface, providing the third gate with a third slanted surface around the fluid passage, providing the fourth gate with a corresponding fourth slanted surface around the fluid passage adjacent the third slanted surface, maintaining the first fluid port open with the first pair in a first position of the first and second gates and closing that first fluid port with the first pair in a second position of the first and second gates relative to each other, providing a first detent and detaining that first pair of first and second sliding gates with the first detent in one of the first and second positions against a first bias acting continuously on the first and second gates, releasing the first pair of sliding gates from the first detent upon occurrence of a first event for sliding movement transversely to the fluid passage, propelling the first pair of sliding gates with the continuously acting first bias to the other of the first and second positions, maintaining the second fluid port open with the second pair in a first position of the third and fourth gates and closing the second fluid port with said second pair in a second position of that third and fourth gates relative to each other, providing a second detent and detaining the second pair of third and fourth gates with that second detent in one of the first and second positions of the third and fourth gates against a second bias acting continuously on the third and fourth gates, releasing the second pair of sliding gates from said second detent upon occurrence of a second event for sliding movement transversely to the fluid passage, and propelling the second pair of third and fourth sliding gates with the continuously acting second bias to the other of their first and second positions.

From a related aspect thereof, the invention resides in apparatus for selectively blocking and deblocking a first fluid port and a second fluid port in a fluid passage, comprising in combination, a first pair of first and second sliding gates movable transversely to that fluid passage at the first fluid port, a second pair of third and fourth sliding gates movable transversely to that fluid passage at the second fluid port, the first gate having a first slanted surface around the fluid passage, the second gate having a corresponding second slanted surface around the fluid passage adjacent the first slanted surface, the third gate having a third slanted surface around the fluid passage, the fourth gate having a corresponding fourth slanted surface around the fluid passage adjacent the third slanted surface, means for maintaining the first fluid port open with the first pair in a first position of the first and second gates and for closing that first fluid port with that first pair in a second position of the first and second gates relative to each other, a first detent for detaining the first pair of first and second sliding gates in one of the first and second positions against a first bias acting continuously on the first and second gates, means for releasing the first pair of sliding gates from the first detent upon occurrence of a first event for sliding movement transversely to the fluid passage, means for propelling the first pair of sliding gates with the continuously acting first bias to the other of the first and second positions, means for maintaining the second fluid port open with the second pair in a first position of the third and fourth gates and closing the second fluid port with the second pair in a second position of said third and fourth gates relative to each other, a second detent for detaining the second pair of third and fourth gates in one of the first and second positions of the third and fourth gates against a second bias acting continuously on the third and fourth gates, means for releasing the second pair of sliding gates from the second detent upon occurrence of a second event for sliding movement transversely to the fluid passage, and means for propelling the second pair of third and fourth sliding gates with the continuously acting second bias to the other of their first and second positions.

The invention resides also in a method of gating a fluid, comprising in combination the steps of, providing a gate housing having a circular fluid inlet and an opposite circular fluid flow outlet, providing in that gate housing a fluid gate moveable transversely to the fluid inlet and fluid outlet, between a closed position wherein the fluid gate blocks passage of fluid between the fluid inlet and fluid outlet, and an alternative open position, providing in that fluid gate a non-circular aperture having a height different from its width, but being equal in cross-section to the circular fluid inlet, for conducting fluid between the fluid inlet and fluid outlet in the open position of the fluid gate and providing a first non-circular fluid passage between the circular fluid inlet and the non-circular aperture, and a second non-circular fluid passage between the non-circular aperture and the circular fluid outlet.

From a related aspect thereof, the invention resides in apparatus for gating a fluid, comprising in combination, a gate housing having a circular fluid inlet and an opposite circular fluid flow outlet, a fluid gate in that housing adapted for movement transversely to the fluid inlet and fluid outlet, between a closed position wherein the fluid gate blocks passage of fluid between the fluid inlet and fluid outlet, and an alternative open position, a non-circular fluid-conducting aperture in the fluid gate having a height different from its width, but being equal in cross-section to the circular fluid inlet, and a first non-circular fluid passage between the circular fluid inlet and the non-circular aperture, and a second non-circular fluid passage between the non-circular aperture and the circular fluid outlet.

The invention resides also in a method of releasably connecting matching first and second bodies of a connector to each other, comprising in combination the steps of providing the first body with a pair of spaced first and second shoulders of which the first shoulder is located closer to the second body than the second shoulder, providing an over-center toggle mechanism with a first end portion connected to the second body, with an opposite second end portion resting on the second shoulder in an over-center position of the toggle mechanism and with an intermediate portion extending from that second end portion in the direction of the first end portion and having a third end portion abutting in the over-center position the first shoulder when the first and second bodies are joined to each other, and engaging the first shoulder with the third end portion to releasably retain the first body connected to the second body.

From a related aspect thereof, the invention resides in apparatus for releasably connecting matching first and second bodies of a connector to each other, comprising, in combination, a pair of spaced first and second shoulders on the first body, with the first shoulder located closer to the second body than the second shoulder, and an over-center toggle mechanism having a first end portion connected to the second body, an opposite second end portion resting on the second shoulder in an over-center position of said toggle mechanism, and an intermediate portion extending from the second end portion in the direction of the first end portion and having a third end portion abutting in the over-center position the first shoulder when the first and second bodies are joined to each other, whereby to releasably retain the first body connected to the second body.

The invention resides also in a method of releasably connecting matching first and second bodies of a connector to each other, comprising in combination the steps of, establishing a magnetic circuit through parts of the first and second bodies having a positive breakaway threshold, releasably retaining the first and second bodies in matching relationship with that magnetic circuit, and selectively breaking the first and second bodies away from each other by breaking that magnetic circuit.

From a related aspect thereof, the invention resides in apparatus for releasably connecting matching first and second bodies of a connector to each other, comprising, in combination, a magnetic circuit extending through parts of the first and second bodies, preferably including pole pieces, and means for selectively breaking the first and second bodies away from each other by breaking that magnetic circuit.

Preferred embodiments of this invention selectively release the first and second bodies from each other by shunting the magnetic circuit, and/or incorporate a valve and a fluid passage in the connector, employ the magnetic circuit for releasably retaining the first and second bodies in matching relationship with the fluid passage intact, and close that fluid passage with the valve upon a breaking of the first and second bodies away from each other.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 1 is an axial section through a gate valve according to a first embodiment of the invention;

FIG. 2 is a section taken on the line 2—2 in FIG. 1;

FIG. 3 is a section taken on the line 3—3 in FIG. 2;

FIG. 4 is a section taken on the line 4—4 in FIG. 2;

FIG. 5 is a view similar to FIG. 1, but showing the valve in a closed, separated condition;

FIG. 6 is an axial section through a dual gate valve according to an embodiment of the invention;

FIG. 7 is a section taken on the line 7—7 in FIG. 6;

FIG. 8 is a section taken on the line 8—8 in FIG. 7;

FIG. 9 is a section taken on the line 9—9 in FIG. 7;

FIG. 10 is a view similar to FIG. 6, but showing the valve in a closed, separated condition;

FIG. 11 is an axial section through a gate valve according to a further embodiment of the invention;

FIG. 12 is a section taken on the line 12—12 in FIG. 11;

FIG. 13 is a section taken on the line 13—13 in FIG. 12;

FIG. 14 is a section taken on the line 14—14 in FIG.

FIG. 15 is a view similar to FIG. 11, but showing the valve in a closed, separated condition;

FIG. 16 is an axial section through a dual gate valve according to another embodiment of the invention;

FIG. 17 is a section taken on the line 17—17 in FIG. 16;

FIG. 18 is a section taken on the line 18—18 in FIG. 17;

FIG. 19 is a section taken on the line 19—19 in FIG. 17;

FIG. 20 is a view similar to FIG. 16, but showing the valve in a closed condition;

FIG. 25 is an axial section through a gate valve assembly according to an embodiment of the invention;

FIG. 26 is a view similar to FIG. 26, but showing a modification thereof;

FIG. 27 is an axial section through a composite gate valve according to an embodiment of the invention;

FIG. 28 is a view similar to FIG. 27 showing the valve in a bypass condition;

FIG. 29 is a view similar to FIG. 27, but showing the valve in a closed, separated condition;

FIG. 30, 31 and 32 are views similar to FIGS. 27, 28 and 29, but showing a modification of that embodiment;

FIG. 33 is an axial section through a composite gate valve according to another embodiment of the invention;

FIG. 34 is a view similar to FIG. 33 showing the valve in a first closed condition;

FIG. 35 is a section taken on the line 35—35 in FIG. 33;

FIG. 36 is a view similar to FIG. 34 showing the valve in a bypass condition;

FIG. 37 is a view similar to FIG. 36, but showing the valve in a second closed, separated condition;

FIGS. 38 to 41 are views similar to FIGS. 33, 34, 36 and 37, but showing a modification of that embodiment;

FIG. 42 is an axial section through a double dual gate valve according to another embodiment of the invention;

FIG. 43 is a section taken on the line 43—43 in FIG. 42;

FIGS. 44 and 45 are views similar to FIGS. 42 and 43, but showing the valve in a closed, separated condition;

FIG. 51 is an axial section through part of a connector according to another embodiment of the invention;

FIG. 52 is a view similar to FIG. 51 showing the connector in an interconnected condition;

FIG. 53 is a view similar to FIG. 51, but showing the connector in a separating condition;

FIG. 54 is an axial section through a gate valve according to an embodiment of the invention similar to FIGS. 51 to 53;

FIG. 55 is a section taken on the line 55—55 in FIG. 54;

FIG. 56 is a view similar to FIG. 54, but showing the valve in a closed, separated condition;

FIG. 57 is an axial section through a magnetic frangible gate valve according to another embodiment of the invention;

FIG. 58 is a section taken on the line 58—58 in FIG. 57;

FIG. 59 is a section taken on the line 59—59 in 57;

FIG. 60 is a view similar to FIG. 57, but showing the valve in a closed, separated condition;

FIG. 61 is an axial section through another magnetic frangible gate valve according to a further embodiment of the invention;

FIG. 62 is a section taken on the line 62—62 in FIG. 61;

FIG. 63 is a section taken on the line 63—63 in FIG. 61;

DESCRIPTION OF PREFERRED EMBODIMENTS

Figure 23:
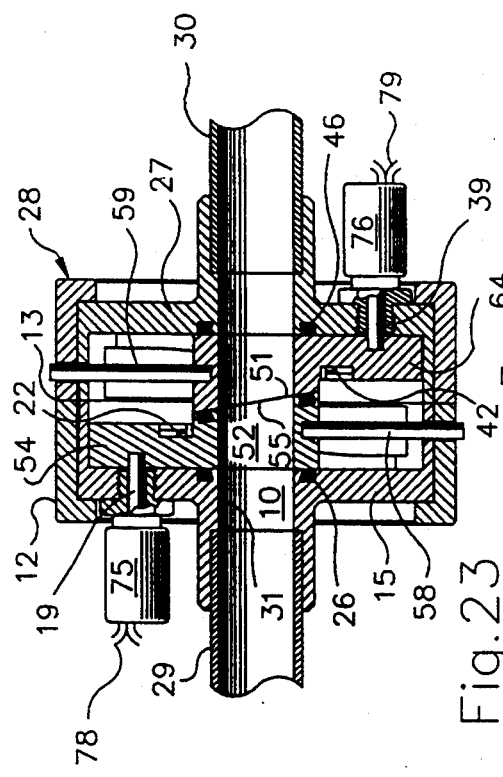
FIG. 23 is an axial section through a dual gate valve according to a further embodiment of the invention.

The drawings presently to be discussed show apparatus and also illustrate methods and are thus described in functional and in structural language.

Methods and apparatus for blocking or controlling a fluid passage according to a preferred embodiment of the invention incorporate such fluid passage 10 in a frangible connection or housing 12. Such frangible connection around the fluid passage may have an indentation or other weakened portion 13 at which it will break upon impact or other predetermined event.

A sliding gate 14 is moveable transversely to the fluid passage 10 in the frangible connection 12.

A base 15 and guides 16 and 17 mount the sliding gate 14 in the frangible connection 12 for movement transversely to the fluid passage between a first position shown for instance in FIG. 1, wherein that fluid passage 10 is maintained open with that gate, and a second position shown for instance in FIG. 5, wherein the fluid passage is closed by that gate. In this or any other manner, the fluid passage is maintained open with the gate in a first position of that gate, but is closed with that gate in a second position of that gate 14.

The illustrated embodiment of the invention provides a detent 19 and detains the gate 14 with that detent in a first or open position against a bias acting continuously on that gate. That bias may be exerted by one or more springs 21 and 22 acting continuously on the gate for propelling that gate 14 to the other of its first and second positions upon release from the detent 19.

The sliding gate 14 is released from the detent 19 upon breakage of the frangible connection 12 and separation from part 27 for sliding movement transversely to the fluid passage 10. A spring 23 may be provided for pushing the gate off its detent 19 or for otherwise releasing the sliding gate from its detent 19 upon breakage of the frangible connection for sliding movement transversely to said fluid passage to its second position whereby that fluid passage is closed by that gate 14, as shown, for instance, in FIG. 5. As shown in FIG. 5, the gate 14 may be wedge-shaped or otherwise have a slanted surface 24 at the guide which is spaced from a corresponding slanted surface in that guide 16. Such showing of that arrangement may also be taken as an illustration of the corresponding design of gate 14 and guide 17 at that other guide.

Instead of the slanted surface or taper 24, a toggle action may be used to press the gate against its seal.

In this or any equivalent manner, the spring 23 is able to push the gate off its detent 19 when the valve parts 15 and 27 separate. The initial spacing between surfaces 24 and 25 assures that the springs 21 and 22 are capable of propelling the gate from its open to its closed position.

The gate 14 thus will be slid or propelled by virtue of the bias at 21 and 22 to its closed position whereby the slanted surface 24 will engage the slanted surface 25 which will seal the gate 14 to the fluid passage 10 in that closed position of gate 14, such as with the aid of an O-ring 26.

FIG. 5 shows the parts 15 and 27 of the valve 28 broken apart along the fractioned frangible connection 13, and the closed gate 14 sealing off a fuel line 29 or other fluid conduit relative to a further conduit 30 or relative to the environment, for that matter.

When open, the fluid passage 10 preferably extends through the gate in the first position of that gate 14. An aperture 31 may be provided in the gate for that purpose.

Unlike prior-art proposals which obstruct the fluid passage, the illustrated embodiment leaves the fluid passage unobstructed by the gate in the first position of that gate shown in FIG. 1. The gate advantageously may be provided with an aperture 31 equal in cross-section to the fluid passage 10.

The embodiment shown in FIGS. 1 to 5 is satisfactory if no backflow from the line 30 is to be feared or if that conduit need not otherwise be sealed off when the frangible connection breaks at 13. However, a dual-gate structure is preferred if that is not the case or if flexibility of control is desired.

In this respect and in general, FIGS. 6 to 10 as well as some of the other figures show methods and apparatus for blocking spaced first and second ports 32 and 33 in a fluid passage 10. That embodiment of the invention provides a pair of first and second sliding gates 14 and 34 moveable transversely to the fluid passage 10. One of these first and second ports, such as the port 32, is maintained open with one of said first and second gates, such as the gate 14, in a first position of that one of these first and second gates relative to the fluid passage 10. That one of the first and second ports, e.g. port 32, is closed with the one of said first and second gates, e.g. gate 14, in a second position of that one of the first and second gates. Reference may be had to the above description of the embodiment shown in FIGS. 1 to 5 for information on the structure and operation of the means 15, 16 and 17, etc., for mounting the one of said first and second sliding gates, e.g. gate 14, for movement transversely to the fluid passage 10 between a first position, such as the one shown in FIGS. 1 to 4 and 6 to 9, wherein that one port, such as the gate 14, is maintained open with that one gate 14, and a second position, such as shown in FIG. 10, wherein that one port is closed by that one gate 14. These means 15, 16, 17 are duplicated in the embodiment shown in FIGS. 6 to 10 and thus include means for mounting the other of first and second sliding gates, such as the sliding gate 34, for movement transversely to the fluid passage 10 between a first position such as the one shown in FIGS. 6 to 9, wherein that other of the first and second ports, such as the port 33, is maintained open with that other of the first and second gates, e.g. gate 34, and a second position, such as shown in FIG. 10, wherein that other port 33 is closed by that other gate 34. In other words, a section through FIG. 6 looking in the direction (i.e. to the right) opposite to the direction of arrows 7—7, would be an inverted mirror image of the section shown in FIG. 7, and a section corresponding to section 9—9 in FIG. 7 would produce for the valve port 34, gate 34 and related guides and components a section which is an inverted mirror image of FIG. 9. Accordingly, in an effort to maintain the number of drawings within reasonable limits, such mirror-image sections have not been shown in drawings which show a second gate in dual-gate structures. Nevertheless, it should be clear from what has been shown how illustrated embodiments maintain the other of the first and second ports, e.i. port 33, open with the other of the first and second gates, e.g. gate 34, in a first position of that other of the first and second gates relative to the fluid passage 10, and how they close that other of said first and second ports, e.g. port 33, with that other of the first and second gates, e.g. gate 34, in a second position of that other gate 34.

Illustrated dual-gate embodiments of the invention provide first and second detents 19 and 39 and detain the first and second gates 14 and 34 with such first and second detents, respectively, in one of their respective first and second positions against a bias acting continuously on said gates, such as shown in FIGS. 6 to 9. That bias may again be exerted by springs 21 and 22 for the first gate 14 and by corresponding springs for the second gate 34, one of which is seen at 42 in FIGS. 6 and 10.

A bias acting continuously on the gates 14 and 34 for propelling these gates to the other of their respective first and second positions upon release from detents 19 and 39 may, however, be provided in any other suitable manner.

The sliding gates 14 and 34 may be released from their detents and closed upon fracture of the frangible connection 13, as already described above in connection with FIGS. 1 to 5. However, dual and multi-gate structures according to embodiments of the subject invention are more versatile, and their function may thus be stated as releasing the first sliding gate 14 from the first detent 19 upon occurrence of an event, for sliding movement transversely to the fluid passage 10, propelling that first gate with its continuously acting bias 21, 22 from a first to a second position, releasing the second sliding gate 34 from its second detent 39 upon occurrence of the same or another event, for sliding movement transversely to the fluid passage, and propelling that second gate with its continuously acting bias 42 from a first to a second position.

Means for releasing the first sliding gate 14 from the first detent 19 upon occurrence of an event for sliding movement transversely to said fluid passage 10 may again include the spring 23 in conjunction with the initial gap between gate and guide surfaces 24 and 25. A like spring and arrangement may be used for releasing the second sliding gate 34 from the second detent 39 upon occurrence of an event for sliding movement transversely to the fluid passage 10.

According to one type of embodiment, both of the first and second gates 14 and 34 may be released upon occurrence of the same or identical event, such as the fracture of a frangible connection. By way of example, the fluid passage 10 may be incorporated in a frangible connection 12 shown also in FIGS. 6 et seq., and both sliding gates 14 and 34 are released from their detents to their second positions upon breakage of that frangible connection at 13. Both conduits 29 and 30 are thus reliably sealed off and the environment is protected against fuel spills or other possibly noxious fluid escapes.

Straight gates are satisfactory if the object is to close the gate or gates if the valve portions come apart, such as in the case of the frangible connection 12 fracturing at 13. However, if the gate releasing event is an event other than separation of the valve portions 15 and 27, or any event preceding the frangible separation, then the preferred embodiment of the invention requires the valve to have a first slanted surface around the fluid passage 10 or gate aperture 31 contacting a corresponding second surface, such as in the second gate 34 if any, or around a fluid passage insert or otherwise around the fluid passage. Such corresponding slanted surfaces, abutting in the open valve position, are then necessary to assure a reliable closure of the valve or a reliable opening for that matter.

Accordingly, that aspect of the invention provides around the fluid passage 10 a first surface 51 slanted relative to that fluid passage or to a longitudinal axis 52 thereof, and provides a gate 54 with a slanted second surface 55 abutting the first surface 51 in an open position of that gate, as shown, for instance, in FIGS. 11 et seq. This is to be distinguished from prior-art approaches which provide slanted surfaces for sealing a gate or other valve element to a fluid port or otherwise sealing the valve shut. This aspect of the invention slants surfaces 51, 55, etc. to facilitate opening of the gate valve or even to enable bypassing of one or more closed gates, such as in the manner more fully disclosed below.

The embodiment of the invention shown in FIGS. 11 et seq. provides around the fluid passage 10 a first surface 51 slanted relative to that fluid passage. A sliding gate 54 movable transversely to that fluid passage is provided with a slanted second surface 55 abutting the first surface 51 in a first position of said gate, such as in the open position shown in FIG. 11. The gate 54 may correspond to the gate 14 and may be maintained open in the fluid passage in the first position of said gate, and the fluid passage may be closed with the gate 54 in a second position of said gate, all in the manner described above for the gate 14. Accordingly, the gate 54 may also be detained with a detent 19 in one of its first and second positions against a bias acting continuously on that gate, and may be released from such detent for sliding movement transversely to the fluid passage 10. Springs 21 and 22 may also be employed for sliding the gate 54 by virtue of their bias to the other of its first and second positions, such as the closed position shown in FIG. 15, especially if the frangible connection 12 is again being used.

FIGS. 16 to 20 show a dual-gate embodiment of the invention in which one of the first and second gates, such as a gate 64 corresponding for instance, to the gate 34 in FIGS. 6 to 10, is provided with the first slanted surface 51 around the fluid passage 10, while the other of said first and second gates, such as the gate 54, is provided with the corresponding second slanted surface 55 around that fluid passage. These first and second gates 54 and 64 are sealed to each other at their first and second slanted surfaces 51 and 55 around the fluid passage 10 in an open position of such first and second gates.

Pins 61 and 62 may be employed for interconnecting the two valve portions 15 and 27 at their gate guides 16, 17, etc. In this manner, the valve may be built as frangible at pins 61 and 62, rather than at a breakable housing.

Figure 21:
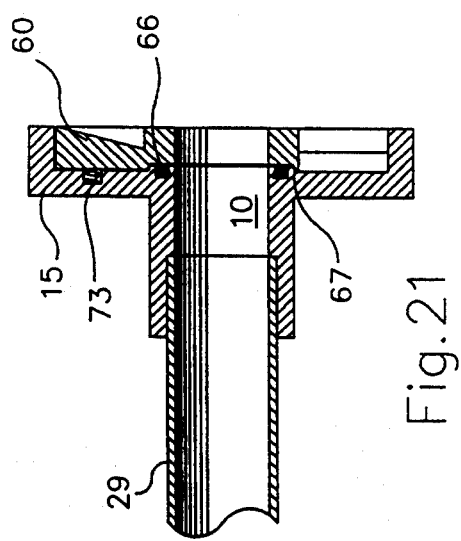
FIG. 21 is a section to an alternative detent structure according to an embodiment of the invention.
Figure 22:
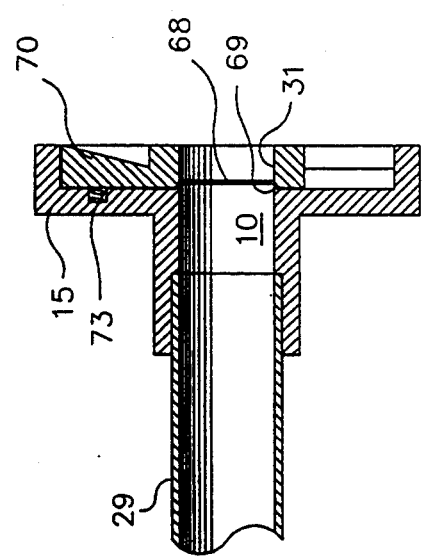
FIG. 22 is a view similar to FIG. 21, but showing a further detent structure according to another embodiment of the invention.

The detents may have a different form than the pins or dowels shown in FIGS. 1 to 20. By way of further example, FIG. 21 shows matching square shoulders 66 and 67 acting as a detent for a modified gate 60 which may, for instance, correspond to the gate 14. FIG. 22 shows preferably annular tapered shoulders 68 around the fluid passage 10, acting as a detent for a gate 70 which has a corresponding recess 69. In such cases, the gate release spring 23 may be replaced by a helical spring 73 for pushing the gate off the recess.

Figure 24:
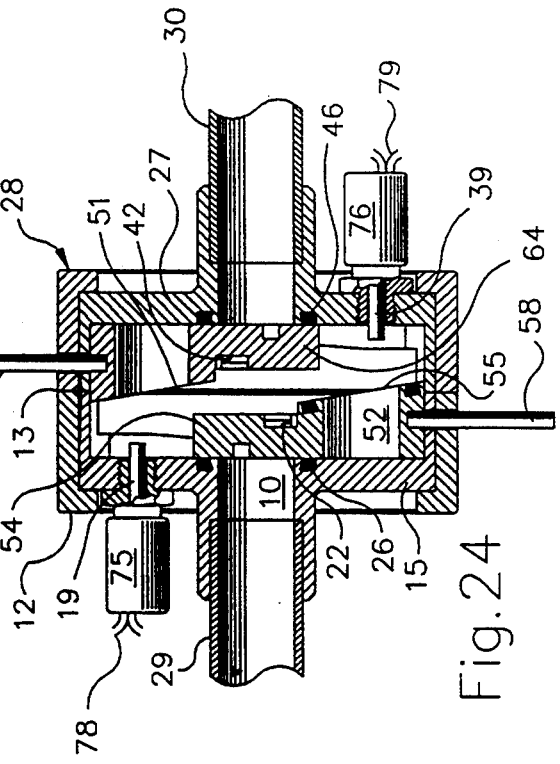
FIG. 24 is a view similar to FIG. 23, but showing the valve in a closed condition.

FIGS. 23 and 24 show features which may also be employed in the embodiments already described or in other embodiments herein shown. For instance, FIGS. 23 and 24 show actuators 75 and 76 for moving the detents 19 and 39 or other releasable gate detention pins or devices, respectively.

In this manner, any of the sliding gates in FIGS. 11 to 24, for instance, may be released manually from its detent. This is herein intended to include the case where the detent 19 or 39 is withdrawn from the gate, such as by one of the controls 75 and 76. The above mentioned springs 23 and 73 may then be omitted.

One or more sliding gates may similarly be released in response to occurrence of a change in temperature, such as when one or more of the actuators 75 and 76 are thermostats or are thermostatically controlled.

Similarly, one or more sliding gates may be released in response to occurrence of a sudden motion, such as when one or more of the actuators 75 and 76 are seismic devices or are seismically controlled.

Alternatively, one or more sliding gates may be released in response to occurrence of a pressure surge. In this respect and in general, any sliding gate may be released from its detent by a pressure actuator or by remote control, as indicated by wiring 78 and 79 at the actuator 75 and 76, for instance.

By way of example, the gates in FIGS. 23 and 24 may be the same as the gates 54 and 64 in FIGS. 16 to 20 and the views shown in FIGS. 17, 18 and 19 may also be the views for FIG. 23, except for a resetting feature presently to be described.

In particular, FIGS. 23 and 24 show the gates 54 and 64 equipped with reset rods 58 and 59, respectively. These rods stick out of the connector housing 12 to indicate release of the gates 54 and 64, as in FIG. 24. The gates may then be manually reset, such as by pushing the rods 58 and 59 back to their reset position shown in FIG. 23 while the detents 19 and 39 are withdrawn by the controls 75 and 76 and are reinserted into the gates to retain these gates against the bias of springs 21, 22 and 42, for instance.

In this or any other manner, the gates 54 and 64 and for that matter the gates 14 and 34 may be reset to their one of their first and second positions, and such reset gates may be detained with their detents 19 and 39 in that one of their first and second positions against the bias of springs 21, 22, 42 or the like. Withdrawal of the detents for resetting may not be necessary if such detents have slanted faces and if springs 23 are used, or if the construction shown in FIGS. 21 and 22 is followed. Of course, a resetting mechanism may not be necessary in the case of frangible connectors which do not have any release other than their release and closing upon breakage of the connector, and which become useless after fracture.

However, resetting mechanisms are generally useful if gates are actuated by or in response to events other than connector breakage.

FIGS. 25 and 26 show a second fluid passage 80 in parallel to the first-mentioned fluid passage 10, and a second frangible connector 112 in that second fluid passage. The first frangible connector 12 in the first fluid passage 10 may be the same as the connector shown in FIGS. 11 to 15, 16 to 20, or 23 and 24, equipped with a manual or automatic release or actuator 76.

Alternatively the connector 112 may be used by itself or in connection with another connector or valve. In either case, the connector 112 shown in FIG. 25 and its expanded version shown in FIG. 26 provides or has a pair of first and second sliding gates 84 and 86 movable transversely to the fluid passage 80. The first gate is provided with a first slanted surface 85 around the fluid passage 80 in an open position of that first gate 84, or around the first gate aperture 131. The second gate is provided with a corresponding second slanted surface 87 adjacent the fluid passage 80 in an open position of that second gate 86.

A fluid port 133 is maintained open with the first gate 84 in a first position of that first gate, but is closed with that first gate in a second position of that first gate relative to the fluid passage 80. A first detent 119 detains the first gate 84 in one of its first and second positions against a first bias acting continuously on that first gate, such as with the aid of one or more bias springs 42 such as disclosed above. In FIGS. 25 and 26, the detent 119 detains the gate 84 in a closed position, whereby the valve or connector 112 is a normally closed connector, while the other valve or connector 12 is normally open in FIGS. 25 and 26.

Conversely, the valve or gate 84 could be held normally open with the detent 119. In either case, the first sliding gate 84 is released from the first detent 119 upon occurrence of a first event for sliding movement transversely to the fluid passage 80 or port 133. Such release may be a withdrawal of the detent 119 from the gate 84 by the control 75. The released first gate 84 propelled with the continuously acting first bias 42 to the other of its first and second positions, such as to the open position whereby the gate aperture 131 is aligned with the fluid passage 80 or port 133.

A second detent 139 is also provided, and the second gate 86 is detained with that second detent 139 in an open position of that second gate against a second bias 142 acting continuously on that second gate. That second sliding gate 86 is released from its second detent 139 upon occurrence of a second event for sliding movement transversely to the fluid passage 80. Such second event is different from the first event which releases the first gate 84. By way of example, the second event may be a fracture of a frangible connector 112 at 113. In either case, the fluid passage 80 is closed with the second gate by propelling that second gate 86 with its continuously acting second bias 142 to its closed position. The first and second gates are sealed to each other at their first and second slanted surfaces 81 and 85 in an open position of the first gate 84 and in the closed position of the second gate 86. In this manner, the port 133 is reliably sealed off, even if the gate 84 is then in an open position.

The valve or connector 212 shown in FIG. 26 may be employed when it is important that the port 132 be also closed off. That embodiment provides a third sliding gate 114 which may be similar to the gate 14 in FIGS. 1 to 5. That third sliding gate is also moveable transversely to the fluid passage between the second sliding gate 86 and the further fluid port 132 in the fluid passage 80.

The frangible connection 113 is now provided between the second and third sliding gates 86 and 114. The further fluid port 132 is maintained open with the third gate in a first position of that third gate 114. Conversely the further fluid port 132 is closed with the third gate 114 in a second position of that third gate 114.

A third detent 119 detains the third gate in an open position against a third bias 122 acting continuously on that third gate 114.

The second and third sliding gates 86 and 114 are released from their second and third detents 139 and 119 upon breakage of the frangible connection 113 for sliding movement transversely to the fluid passage 80. The further fluid port 132 is closed by sliding the third gate 114 by virtue of its third bias 122 to a closed position, while propelling the second gate with its second bias 142 to its closed position as well. Both fluid ports 132 and 133 are thus reliably sealed off, even if the first gate 84 should happen to be open at that point.

In the embodiment of FIGS. 25 and 26, the controls 75 and 76 can override each other. For instance, if the gate 64 closes automatically or by remote control, the pilot or other operator may still need fuel or supply of another fluid. In these and other cases, he, she, or another control 75 can override or circumvent the then closed gate 64 by opening the normally closed gate 84, such as by withdrawal of the detent 119.

Of course, no override is generally desired if the frangible connectors break up due to a crash or otherwise. For that event, FIGS. 23 and 24 provide one or more automatic shutoff gates 86 and 114 as described above.

The sliding gates 54 and 64 may be provided in a similar frangible connector 12 so that the fluid passage 10 is cut off as well in case of a crash or other breakage of the frangible connection 13.

More generally speaking, the fluid passage 80, in which the gate valve 112 or 212 is provided, may be structured as a bypass of another fluid passage 10, and other sliding gates 54 and 64 may be provided for selectively opening and closing that other fluid passage. The gate 84 may then be used or actuated for selectively bypassing the other sliding gates when their other fluid passage 10 has been closed, such as by energization of the actuator 76 shown in FIGS. 25 and 26.

The embodiments of the invention according to FIGS. 27 to 41 provide the first slanted surface 51 in a fluid passage insert 151 spaced from a fluid port 152 in the fluid passage 10 and provide the sliding gate 54 in the fluid passage between that fluid port and that fluid passage insert for closure of that fluid port in the second position of the gate as shown in FIGS. 28, 29, 31, 32, 34 to 37 and 39 to 41. On the other hand, as in FIGS. 11, 16, 23, 25, 26, the first and second slanted surfaces 51 and 55 are sealed to each other around the fluid passage when that fluid passage is open to the fluid port 152 in the first position of the gate 54 as also shown in FIGS. 27, 30, 33 13 and 38. Conversely, the first and second slanted surfaces and 55 are separated from each other and the fluid port is closed with the sliding gate in the second position of that gate 54.

The currently discussed embodiment also provides a bypass port 154 spaced from the fluid port 152.

The bypass 154 is normally closed such as by a valve 155 as shown in FIGS. 27 and 30, or by another sliding gate 156 as shown in FIGS. 33, 34, 38 and 39. However, the bypass may be opened, such as manually or by an actuator 158 energized through wires 159 from a remote control. In the embodiments of FIGS. 27, 30, 33 and 38 this is of no effect if the gate 54 is open and the slanted surfaces 51 and 55 are sealed to each other.

However, as indicated by a dotted line 158 in FIGS. 28, 31, 36 and 40, a closed fluid port is selectively bypassed through the bypass port 154 and past the then separated first and second slanted surfaces 51 and 55. Accordingly, the bypass 154 or its control 158 are able to override the control 75 or other actuation of the, gate valve 54.

As also shown in FIGS. 27 to 40, an embodiment of the invention provides the first slanted surface 51 in a fluid passage insert 151 between a first fluid port 152 and a second fluid port 159 in the fluid passage 10. The sliding gate is provided in the fluid passage between the first fluid port 152 and the fluid passage insert 151 for closure of that first fluid port in the second position of said gate 54 shown, for instance in FIGS. 28, 29, 31, 32, 34 to 37 and 39 to 41, as already mentioned above.

However, the illustrated embodiment also provides between the second fluid port 159 and the fluid passage insert 151 a second sliding gate 14 movable transversely to the fluid passage. At least that second sliding gate and the fluid port 159 are incorporated in a frangible connection 12.

The second fluid port 159 is maintained open with the second gate 14 in a first position of that second gate. That embodiment closes the fluid passage insert 151 with the second gate 14 in a second position of that second gate. In this respect, a second detent is provided and the second gate is detained with that second detent in an open position against a second bias 22 acting continuously on that second gate 14.

As its predecessor in FIGS. 1 to 10, that second sliding gate 14 is released from the second detent 19 upon breakage of the frangible connection 13 for sliding movement transversely to the fluid passage 10 or fluid passage insert 151. The second gate 19 thus slides by virtue of its second bias 22 to a closed position, such as shown in FIGS. 29, 32, 37 and 41, closing the fluid passage insert 151 with the second gate in that closed position of that second gate 14.

In the embodiments of FIGS. 27 to 32 the bypass port 154 is a third fluid port in parallel to the first fluid port 152 for selectively passing fluid 158 through that third fluid port 154 and in between the now separated first and second slanted surfaces 51 and 55 through the fluid passage insert 151 and through the second fluid port 159, when the first fluid port 152 is closed while the second fluid port 159 is open, as shown in FIGS. 28 and 31, for instance.

In the illustrated embodiments of FIGS. 30 to 32 and 38 to 41, a pair of further sliding gates 14 and 34, moveable transversely to the fluid passage 10, is provided between the fluid passage insert 151 and the second fluid port 159. At least that pair of further sliding gates and that second fluid port are incorporated in a frangible connection 12.

As shown in FIGS. 30 and 31 and 38 to 40, the second fluid port 159 is maintained open with the pair of further gates 14 and 34 in their corresponding first positions shown in FIGS. 30 and 31 and 38 to 40, and also in FIG. 6 for that matter.

Figure 41:
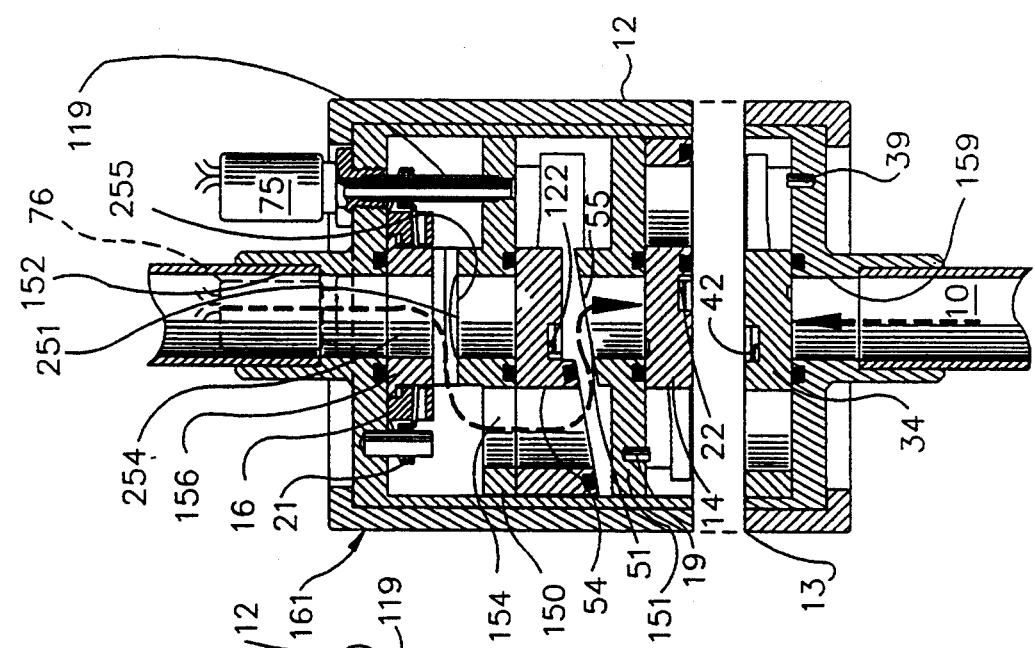

Conversely, the fluid passage insert 151 and the second port 59 are closed with the pair of further gates 14 and 34 in corresponding second positions of these further sliding gates, shown in FIGS. 10, 32 and 41. Further detents 19 and 39 are provided for detaining the pair of further gates 14 and 34 with such further detents in open positions against a further bias 22 and 42 acting continuously on that pair of further gates, as in FIGS. 6, 30 to 31, and 38 to 40.

The pair of further sliding gates 14 and 34 is released from their further detents 19 and 39 upon breakage of the frangible connection at 13 for sliding movement transversely to the fluid passage 10 or fluid passage insert 151 and second fluid port 159.

The pair of further gates 14 and 34 are slid by virtue of their further bias 22 and 42 to their closed position shown also in FIG. 10, and the fluid passage insert 151 and second fluid port are closed with the pair of further gates in the closed position of that pair of further gates 14 and 34, as shown in FIG. 32 and 41, for instance.

In this manner, backflow of fluid through the second port is prevented as well upon breakage of the frangible connection at 13.

As apparent from this disclosure, the embodiments of FIGS. 33 to 41 have much in common with the embodiments in the preceding figures. However, they may also be considered separately as follows.

In particular, FIGS. 33 to 41 show connectors 161 and 162 having two fluid passage inserts 150 and 151 mutually spaced between first and second fluid ports 152 and 159 in the fluid passage 10.

The first fluid passage insert 150 has a first surface 255 slanted relative to the fluid passage 10 or its longitudinal axis 256. The second fluid passage insert 151 has the previously described surface 55 slanted relative to the fluid passage 10.

A first gate 156 is located between the first port 152 and first fluid passage insert 150 and is slidable between such first fluid port and first fluid passage insert transversely to the fluid passage 10. A second gate 54 is located between the first and second fluid passage inserts 150 and 151 and is slidable between such first and second fluid passage inserts transversely to the fluid passage 10.

The first sliding gate 156 and first fluid passage insert 150 have corresponding first and second surfaces 251 and 255 slanted relative to the fluid passage 10 or to its longitudinal axis 256. Similarly, the second slidable gate 54 and the second fluid passage insert 151 have corresponding third and fourth surfaces 51 and 55 slanted relative to the fluid passage 10.

In the open position of the first slidable gate 156 shown in FIGS. 33, 34, 38 and 39, the first and second slanted surfaces 251 and 255 are in engagement with each other around the open fluid passage 10. Similarly, in the open position of the second slidable gate 54, the third and fourth slanted surfaces 51 and 55 are in engagement with each other around the fluid passage 10. Accordingly, a bypass or third port 154 in the first fluid passage insert 150 is ineffective as long as the first and second sliding gates 156 and 54 are in their open position. As apparent from FIGS. 34 and 39, this is still the case even after the second sliding gate 54 has been released to its closed position. In that respect, the sliding gate 54 may be closed by virtue of a bias 122 upon withdrawal of a detent 119, such as by an actuator 75. In that case, the actuator is capable of effecting a stopage of the fluid flow through the valve 161 or 162.

Figure 40:
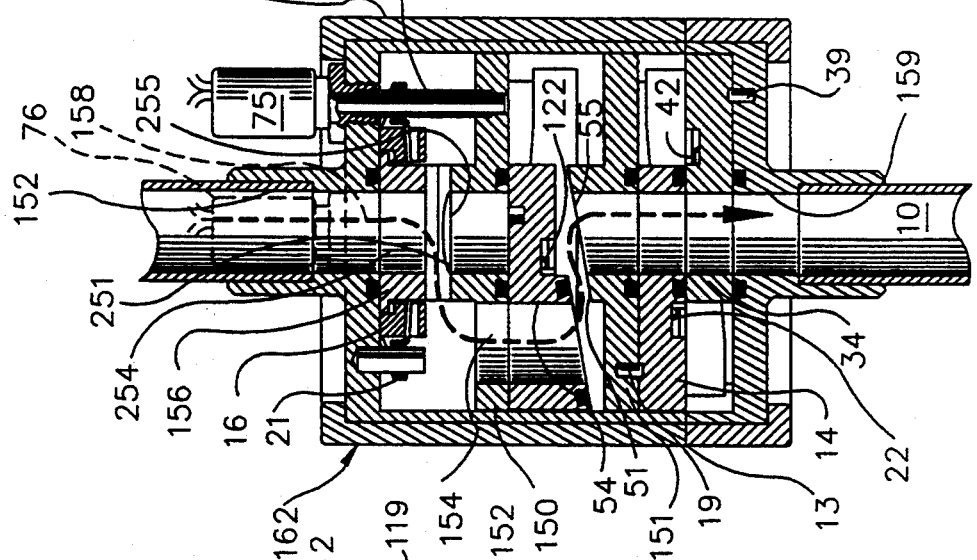
Figure 39:
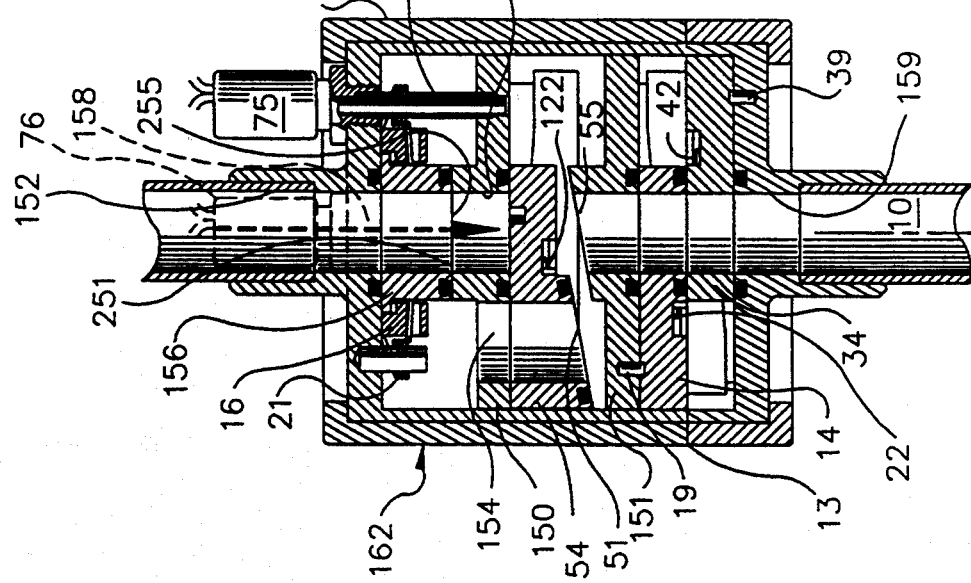
Figure 49:
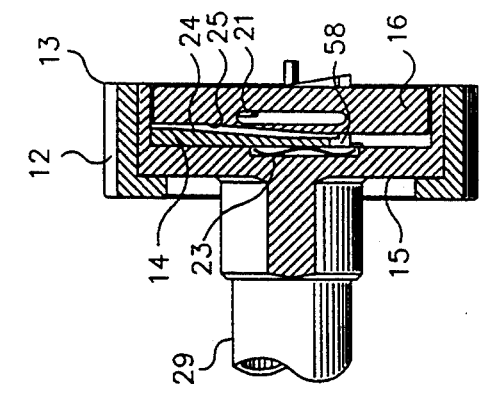
FIG. 49 is a section taken on the line 49—49 in FIG. 47.
Figure 46:
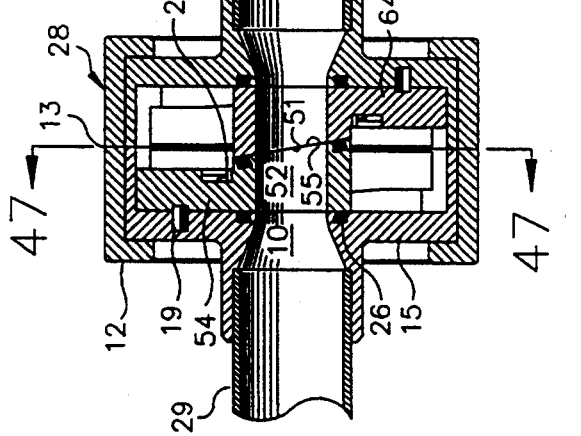
FIG. 46 is an axial section through a gate valve according to a further embodiment of the invention.
Figure 47:
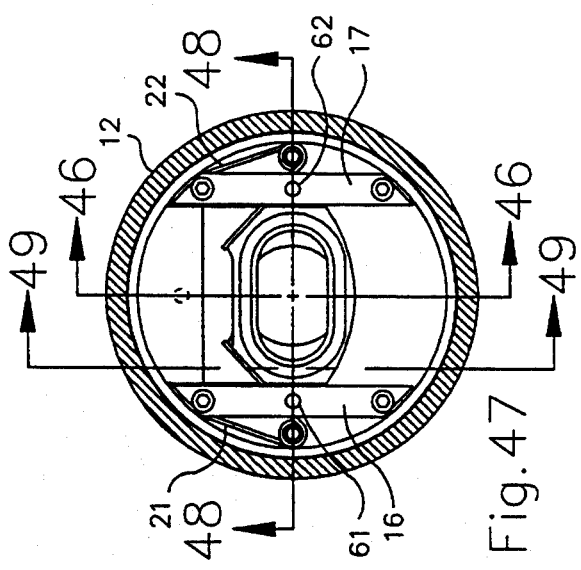
FIG. 47 is a section taken on the line 47—47 in FIG. 46.
Figure 50:
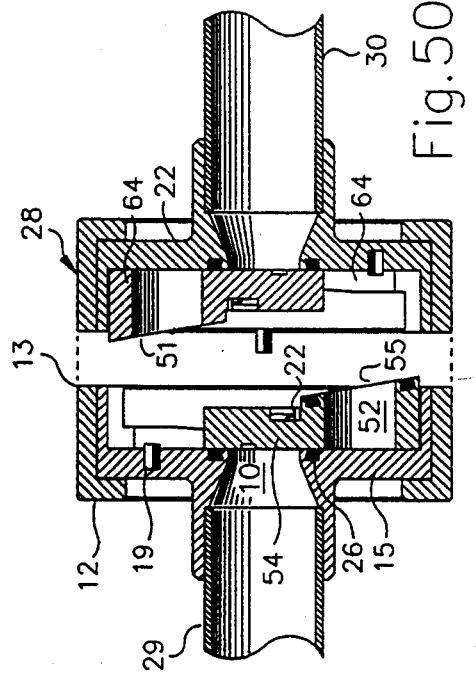
FIG. 50 is a view similar to FIG. 46, but showing the valve in a closed condition; .
Figure 48:
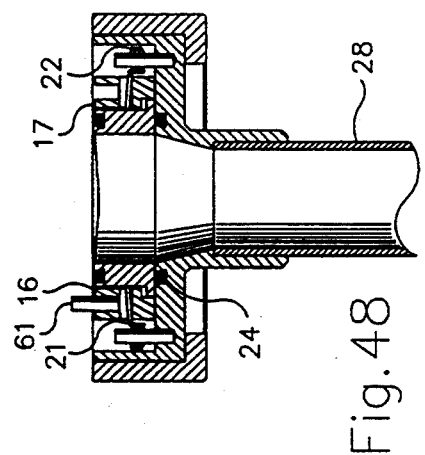
FIG. 48 is a section taken on the line 48—48 in FIG. 47.

On the other hand, the operator or another control can override that fluid passage by transversely sliding the first gate 156 from its first position in alignment with the first fluid port 52 shown in FIGS. 33, 34, 38 and 39 to its second position out of alignment with the first fluid port 152, as shown in FIGS. 36, 37, 40 and 41, either manually or by energization of an actuator 76 shown in dotted outline in FIGS. 33 to 41 as being hidden from view by the inlet or top fluid pipe as shown in FIGS. 33 et seq. The actuator 76 may be the same kind as shown in FIG. 24, having a rod 39 entering an aperture 254 in the gate 156 for releasably detaining that gate against the bias of springs 21 and 22. Instead of going sidewise, as the other gates, the gate 156 goes back and forth as seen in FIGS. 35 and 36 for instance, transversely to the fluid passage 10. If the actuator 76 withdraws the rod 39 out of the corresponding aperture 254 in the gate 156, the bias of springs 21 and 22 propels the gate along guides 16 and 17 upward as seen in the cross-section of FIG. 35, or to the front as seen in the vertical cross-section of FIG. 36, whereby the bypass aperture 254 in gate 156 becomes aligned with the inlet port 152 instead of the regular gate aperture. In that case, fluid 158 can flow through the first fluid port 152, the bypass aperture 254, in between the now separated slanted surfaces 251 and 255, bypass port 154, and the now separated slanted surfaces 51 and 55 through the second fluid port 159, as shown in FIGS. 36 and 40. The gate 156 or its actuator 76 thus may serve as an override of the gate 54 or its actuator 75.

Nevertheless, all fluid flow at least through the first port 152 is stopped by the then closed third sliding gate 14 upon fracture of the frangible connection at 13, as shown in FIG. 37, for instance. Moreover, all fluid backflow is also stopped through the second fluid port 159 when breakage of the frangible connection at 13 causes also the fourth sliding gate to close that second fluid port as shown in FIG. 41, for instance.

In practice, the gate 54 in the embodiments of FIGS. 27 to 41 and the gate 156 in the embodiments of FIGS. 33 to 41 may be reset mechanically or manually as disclosed above with respect to or in FIGS. 23 and 24.

A double-double gate arrangement 300 capable of blocking off both fluid ports 32 and 33 is shown in FIGS. 42 to 45. That embodiment of the invention is representative of methods and apparatus for selectively blocking and deblocking a first fluid port 32 and a second fluid port 33 in a fluid passage 10. These methods and apparatus provide a first pair 301 of first and second sliding gates 302 and 303 movable transversely to the fluid passage 10 at the first fluid port 32, a second pair 305 of third and fourth sliding gates 306 and 307 movable transversely to the fluid passage 10 at the second fluid port 33. The first gate has or is provided with a first slanted surface 308 around the fluid passage. The second gate has or is provided with a corresponding second slanted surface 309 around the fluid passage adjacent the first slanted surface 308. The third gate has or is provided with a third slanted surface 312 around the fluid passage. The fourth gate has or is provided with a corresponding fourth slanted surface 313 around the fluid passage adjacent said third slanted surface 312.

The first fluid port 32 is maintained open with the first pair 301 in a first position of its first and second gates 302 and 303, and that first fluid port 32 is closed with that first pair 301 in a second position of these first and second gates 302 and 303 relative to each other. A first detent 319 detains the first pair of first and second sliding gates 302 and 303 in one of their first and second positions, such as in the open position shown in FIGS. 42 and 43, against a first bias 321 and/or 322 acting continuously on such first and second gates.

That first pair 301 of sliding gates is released from the first detent 319 upon occurrence of a first event for sliding movement transversely to the fluid passage 10, and that first pair of sliding gates 302 and 303 is propelled with the continuously acting first bias 321 and/or 322 to the other of their first and second positions, such as to the closed position shown in FIGS. 44 and 45.

Gate guides 316 and 317 similar to the guides 16 and 17 shown in FIGS. 2 and 4, may be provided for guiding the gates 302 and 303, and similar guides may also be provided for guidance of the gates 306 and 307.

The second fluid port 33 is maintained open with the second pair 305 in a first position of its third and fourth gates 306 and 307, and that second fluid port 33 is closed with that second pair 305 in a second position of these third and fourth gates 306 and 307 relative to each other. A second detent 339 detains the second pair of third and fourth gates 306 and 307 in one of the first and second positions of these third and fourth gates, such as in their open position shown in FIGS. 42 and 43, against a second bias 342 acting continuously on these third and fourth gates.

That second pair 305 of sliding gates is released from the second detent 339 upon occurrence of a second event for sliding movement transversely to the fluid passage 10, and that second pair of third and fourth sliding gates 306 and 307 is propelled with the continuously acting second bias 342 to the other of their first and second positions, such as to the closed position shown in FIGS. 44 and 45.

The mentioned first and second events affecting the first and second pairs of gates 301 and 305 may be one and the same event, such as the fracture of the frangible connection 13. On the other hand, when remote or other controls 75, 76, etc. are also used in the embodiment of FIGS. 42 to 45, that embodiment is more flexible, and either gate pair 301 and 305 may be maintained closed with the detent 319 or 339, to be opened with the bias 321, 322 or 342.

By way of example, FIGS. 46 to 50 show features for gating a fluid according to a further aspect of the invention, in terms of the dual gate valve of FIGS. 6 to 10. However, it should be understood that these features may be used with the other gate valves herein disclosed or even with prior-art gate valves or with other methods or apparatus for gating a fluid.

Again, the embodiment of FIGS. 46 to 50 provides a gate housing 12 having a circular fluid inlet 129 and an opposite circular fluid flow outlet 130, and provides in that gate housing a fluid gate 114 moveable transversely to the fluid inlet and fluid outlet, between a closed position wherein that fluid gate blocks passage of fluid between the fluid inlet and fluid outlet, and an alternative open position. The embodiment of the invention shown in FIGS. 46 to 50 further provides in the fluid gate 114 a non-circular aperture 110 having a height 212 different from its width 213, but being equal in cross-section to the circular fluid inlet 129 and/or to the circular fluid outlet 130, for conducting fluid between the fluid inlet and the fluid outlet in the open position of the fluid gate. Fluid inlet and outlet 129 and 130 being interchangeable as inlets and outlets. The illustrated embodiment further provides a first non-circular fluid passage 232 between the circular fluid inlet 129 and the non-circular aperture 110, and a second non-circular fluid passage 233 between that non-circular aperture and the circular fluid outlet 130, serving as transitions between the circular and non-circular fluid passages 129-110-130.

While that principle is also applicable to single-gate structures, such as the one shown in FIGS. 1 to 5, FIGS. 46 to 50 show dual gates 14 and 34 having the oval or non-circular apertures 110. This may be expressed differently as subdividing the gate 114 into two oppositely moveable gate sections 14 and 34 and providing the non-circular aperture 110 through both of these gate sections, such as in the form of non-circular apertures 210 and 310, constituting the compound gate aperture 110 in the open gate position shown in FIG. 46.

Oval or non-circular apertures 110, 210, and 310 help the design and construction of gate valve without diminishing the effective fluid flow cross-section. For instance, as apparent from FIG. 47, more space for gate movement can be made available, if the gate aperture 110 is made oval, rather than circular.

FIGS. 51 et seq. disclose an alternative frangible connector which may be used for the gate valves herein disclosed in lieu of the frangible connector 12. However, the embodiments of FIGS. 51 et seq. may alternatively be used for hydraulic, pneumatic, electrical and other connectors and in general for releasably connecting matching first and second bodies of a connector to each other.

According to FIGS. 51 to 56, a connector 400 has a first body 401 which is provided with a pair of spaced first and second shoulders 404 and 405 of which the first shoulder 404 is located closer to the second body 402 or to a rim or opening 406 of that first body 401, than the second shoulder 405.

That embodiment provides one or more over-center toggle mechanisms 410 with a first end portion 411 connected to the second body 402, such as by a rivet 412, with an opposite second end portion 413 resting on the second shoulder 405 in an over-center position of that toggle mechanism shown in FIGS. 52 and 54 and with an intermediate portion 414 extending from that second end portion 413 in the direction of the first end portion 411, or attached thereto by a hinge mechanism or otherwise, and having a third end portion 415 abutting in that over-center position the first shoulder 404 when the first and second bodies 401 and 402 are joined to each other as in FIGS. 52 and 54.

As shown in FIG. 51, the third end portion 415 engages the first shoulder 404, such as at a projection 406, when the second body 402 is moved toward the first body 401 in the direction of arrow 417 whereby the free portion of the overcentered toggle mechanism 410 slides over the shoulder 404 until the third end portion 415 falls into the shoulder 404 as shown in FIG. 52 and the mechanism 410 is pushed down to provide preloading, as indicated by the arrow 418, to its over-center position shown in FIGS. 52 and 54, whereby the second end portion 413 comes to rest on the second shoulder 405 and the engagement of the first shoulder 404 with the third end portion 415 releasably retains the first body 401 connected to the second body 402.

As shown in FIG. 53, the first body 401 may be released from the second body 402 by or when moving the first and second bodies relative to each other, such as indicated by arrow 420, until the second end portion 413 falls from the second shoulder 405 as indicated by arrow 421 and the third end portion 415 is levered away and disengages from the first shoulder 404. In this respect, it may be noted from FIG. 53 that the portion 415 pivots away from the shoulder 404. The first and second bodies can then be pulled apart, as seen in FIG. 56.

According to a further embodiment, a fluid passage 10 is provided through the matching first and second bodies 401 and 402, and that fluid passage is blocked when the first and second bodies are released from each other.

In this respect, a gate or valve 14 may be provided in at least one of the first and second bodies 401 and 402. As in FIGS. 1 et seq., the valve 400 also provides an open fluid passage 10 through its first and second bodies and the valve 14 when the matching first and second bodies 401 and 402 are connected to each other, but closes that fluid passage with that valve 14 when these first and second bodies are released from each other, as in FIG. 48.

The more specific embodiment shown in FIGS. 54 to 56, provides a fluid passage 10 in the matching first and second bodies 401 and 402, and a sliding gate 41 moveable transversely to that fluid passage in the connector 400. The fluid passage is maintained open with the gate in a first position of that gate 14, such as shown in FIG. 54. Conversely, the fluid passage is closed with that gate in a second position of that gate, such as shown in FIG. 56. A detent 19 is again provided and the gate is detained with that detent in an open position against a bias acting continuously on that gate 14, such as also shown in FIG. 54. The sliding gate is released from its detent 19 when the first and second bodies are released from each other for sliding movement transversely to said fluid passage, and that gate is slid or propelled by virtue of its bias 21 to a closed position, and is sealed to the fluid passage or to a port 33 in that closed position of the gate, such as shown in FIG. 56.

The embodiment of FIGS. 51 to 56 has the advantage that the frangible connection and the open gate position may be restored, such as shown in FIG. 51 to the operating position shown in FIG. 52 or 54.

The same applies in essence to the embodiment of the invention shown in FIGS. 57 to 66. As there shown, matching first and second bodies 501 and 502 of a connector 500 are releasably connected to each other. That embodiment of the invention establishes a magnetic circuit 504 through parts 505 and 506 of the first and second bodies 501 and 502 having a positive breakaway threshold, and releasably retains such first and second bodies in matching relationship with that magnetic circuit. By way of example, these parts may be magnetic pole pieces 505 and 506 which provide the desired breakaway threshold, energized by magnets 508 and 509 and separated by non-magnetic spacers 510 The breakaway threshold being produced by the sudden and instantanuous collapse of the magnetic field in magnetic pole pieces 505 and 506 at the slightest separation of the matching first and second bodies 501 and 502. and 511. These magnets may be electromagnets, but typically will be permanent magnets, in which case the length of the individual sections determines magnetic field strength.

The first and second bodies 501 and 502 are selectively broken away from each other by breaking the magnetic circuit 504. In this respect, the magnetic field in the circuit 504 will resist such pulling apart of connector bodies 501 and 502. The connector is thus not easily broken against the positive breakaway threshold. However, if the force becomes strong relative to the magnetic field, exceeding the positive breakaway threshold, sudden breakage of the connector occurs and the bodies 501 and 502 are separated from each other, as shown in FIG. 60.

It can thus be said that the embodiments of FIGS. 57 to constitute a frangible connector that preserves its integrity until there is a crash or other event that causes the connector to break away along the fluid passage 10 in order to prevent a fuel leakage or other detrimental occurrence happening along the fluid passage 10.

However, in addition to or even apart from this there is a need to have connectors that can be broken down or taken apart against the existence of a magnetic field even if there is no crash or the like. In this respect, FIGS. 61 to 66 show embodiments of the invention which selectively release the first and second bodies 501 and 502 from each other by shunting the magnetic circuit 504. By way of example, FIGS. 61 to 64 show shunt rings 514. These are rings of steel or other resilient ferromagnetic material that have a gap permitting radial expansion of the shunt ring 514 upon application of a force thereto.

As seen in FIGS. 61 to 64, the circumferences of the shunt rings 514 are sufficiently spaced from the adjacent outer pole piece 505 or 506 to prevent shunting of the magnetic field 504 when the connector is an operative condition. In the illustrated embodiment, the inwardly acting inherent resiliency or bias of the shunt ring 514 is then stronger than any radial magnetic field therealong between inner and outer pole pieces 505 or 506.

Figure 66:
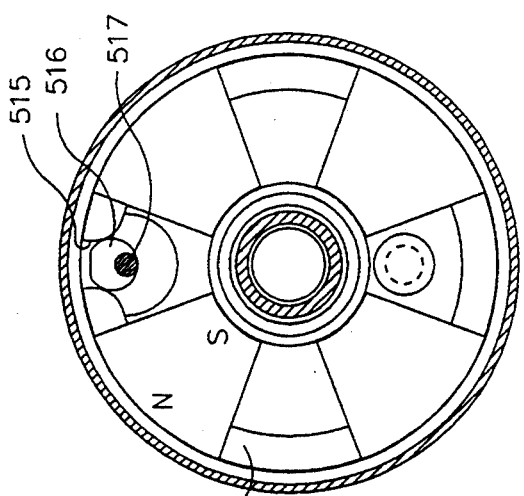
FIG. 66 is a section taken on the line 66—66 in FIG. 64.

However, if the adjacent end portions of the shunt ring 514 at the gap 515 are driven apart, then the shunt ring is radially expanded until it physically and magnetically bridges adjacent pole pieces 505 or 506. As shown in FIG. 66 relative to FIG. 63, an eccentric actuator 516 can be provided for forcing the shunt ring 514 outwardly at the gap 515 circumferentially in contact with the outer pole piece. The actuator 516 may be eccentrically shaped on a shaft 517 which is rotated or angularly moved by a handle 518.

Figure 64:
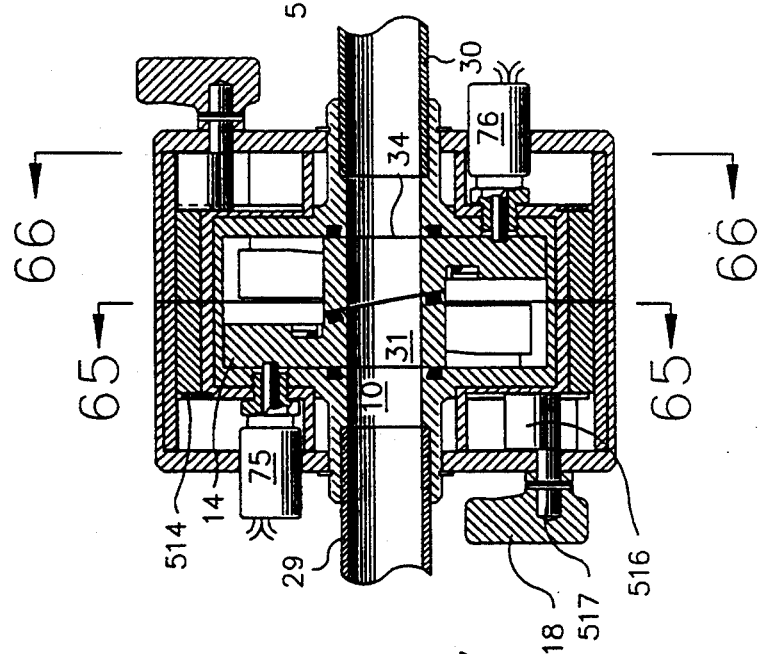
FIG. 64 is an axial section through a magnetic frangible dual gate valve according to another embodiment of the invention.
Figure 65:
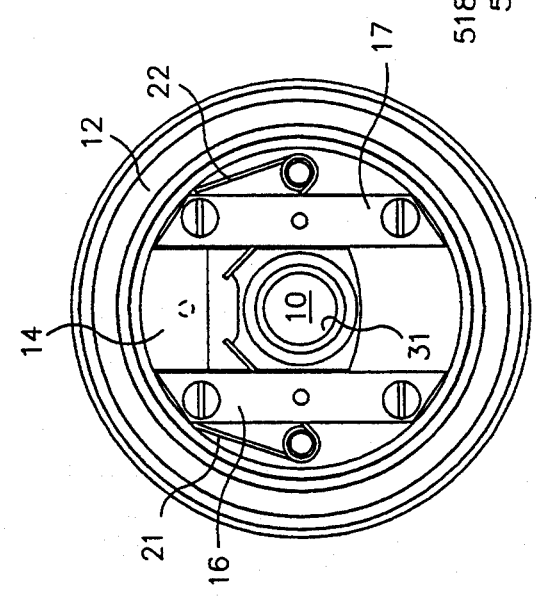
FIG. 65 is a section taken on the line 65—65 in FIG. 64.

By way of example, the or either shunt ring 514 may be activated by manually engaging the particular handle 518 and rotating or angularly moving the eccentric actuator 180° from the inactive or quiescent position seen in FIGS. 61, 63, 64, to the active or activated position shown in FIG. 66.

The connector halves or bodies 501 and 502 can then be taken apart or will disconnect without occurrence of the strong force or powerful event necessary for breakup of the connector.

The connector can be reassembled by restoring the or each eccentric actuator 516 to its inactive position such as shown in FIGS. 61, 63 and 64. The shunt ring 514 then returns to its illustrated contracted condition on its own resiliency or bias. Alternatively, the shunt ring may be biased in the direction of shunting and a return mechanism (not shown) may be provided for returning the shunt ring to its non-shunting position away from the adjacent outer pole piece.

The fluid control or blockage features shown in FIGS. 1 to 50 may also be embodied in the magnetic embodiments of FIGS. 57 to 66, as shown to a limited extent by use of the same reference numerals for corresponding, similar or identical parts in FIGS. 57 to 66 as in their preceding FIGS. 1 et seq.

In fact, the magnetic version may be used where a frangible connector or connection has been shown in FIGS. 1 et seq. An advantage of using the magnetic version is that the connector and its housing are not damaged by a breakaway, and can be easily restored or reassembled.

In this or in any other manner, one or more valves 14, 34 etc. and a fluid passage 10 are incorporated in the connector 500, and the magnetic circuit 504 is employed for releasably retaining the first and second bodies 501 and 502 in matching relationship, with said fluid passage 10 intact. However, the fluid passage is closed with the valve upon the breaking of the first and second bodies away from each other, such as in the manner described above for frangible connectors 12 and 112 for example.

While I have illustrated particular embodiments of my invention, it will, of course, be understood that I do not wish to be limited thereto since various modifications both in method and apparatus may be made, for example, in place of the bilateral guide a single centrally disposed guide could be substituted. Similarly, the transversal sliding motion of the gate need not be rectilinear, but could be curvilinear as would be if other types of gates were substituted such as a hinged, pivoted, or rotary gate. It then follows that any alternative gate type would still be within the claimed invention. Also where the continuously acting bias is represented by a torsion spring any means providing a continuous bias could be used, including, for example, air springs. In the magnetic frangible connector, the magnet and pole pieces are the preferred embodiments of the invention as providing the novel breakaway threshold, though the magnet alone can be used. Furthermore, any other frangible clamps other than those specifically shown in the embodiments can be used.

In general these and other variations and alternatives as would be obvious to a person skilled in the art or conversant in this area of expertise would all come within the scope of this invention and I contemplate by the appended claims to cover any such modifications as fall within the true spirit and scope of my invention.

The subject extensive disclosure will render apparent or suggest to those skilled in the art various further modifications and variations within the spirit and scope of the subject invention and equivalents thereof.

I claim:

1. A method of releasably connecting matching first and second bodies of a connector to each other, comprising in combination the steps of:

establishing a magnetic circuit through parts of said first and second bodies and channeling said magnetic circuit through pole pieces obtaining a positive breakaway threshold;

releasably retaining said first and second bodies in matching relationship with said magnetic circuit; and selectively breaking said first and second bodies away from each other by breaking said magnetic circuit;

incorporating a valve and a fluid passage in said connector;

employing said magnetic circuit for releasably retaining said first and second bodies in matching relationship with said fluid passage intact; and closing said fluid passage with said valve upon said breaking of first and second bodies away from each other;

providing said valve with a sliding gate movable transversely to said fluid passage in said connector;

maintaining said fluid passage open with said gate in a first position of said gate; closing said fluid passage with said gate in a second position of said gate;

providing a detent and detaining said gate with said detent in an open position against a bias acting continuously on said gate;

releasing said sliding gate from said detent upon movement of said first and second bodies away from each other for sliding movement of said sliding gate transversely to said fluid passage;

sliding said gate by virtue of said bias to a closed position; and sealing said gate to said fluid passage in said closed position of said gate.

2. A method as in claim 1, including the step of:
selectively releasing said first and second bodies from each other by shunting said magnetic circuit.

3. Apparatus for releasably connecting matching first and second bodies of a connector to each other, comprising in combination;

a magnetic circuit extending through parts of said first and second bodies; and means for selectively breaking said first and second bodies away from each other by breaking said magnetic circuit; a valve and a fluid passage in said connector;

said valve being a sliding gate adapted for movement transversely to said fluid passage in said connector; and said apparatus includes means including a detent for detaining said gate in an open position against a bias acting continuously on said gate; and means for closing said fluid passage with said valve upon breaking of said first and second bodies away from each other.

4. Apparatus as in claim 3, wherein: said parts include pole pieces.

5. Apparatus as in claim 3, including: selectively shunting said magnetic circuit.

* * * * *